US008799297B2

(12) United States Patent  (10) Patent No.: US 8,799,297 B2
Holsman  (45) Date of Patent: Aug. 5, 2014

(54) EVALUATING SUPPLY OF ELECTRONIC CONTENT RELATING TO KEYWORDS

(75) Inventor: Ian Holsman, Richmond (AU)

(73) Assignee: AOL Inc., Dulles, VA (US)

(*) Notice: Subject to any disclaimer, the term of this patent is extended or adjusted under 35 U.S.C. 154(b) by 297 days.

(21) Appl. No.: 13/052,607

(22) Filed: Mar. 21, 2011

(65) Prior Publication Data

US 2012/0246178 A1  Sep. 27, 2012

(51) Int. Cl.
*G06F 17/30* (2006.01)

(52) U.S. Cl.
USPC ............. 707/751; 707/722; 707/736; 706/12; 706/14; 706/45

(58) Field of Classification Search
None
See application file for complete search history.

(56) References Cited

U.S. PATENT DOCUMENTS

| | | | |
|---|---|---|---|
| 6,757,682 B1 | 6/2004 | Naimark et al. | |
| 7,668,823 B2 | 2/2010 | Oldham et al. | |
| 7,814,112 B2 * | 10/2010 | Gupta et al. | 707/758 |
| 8,200,693 B2 * | 6/2012 | Steele et al. | 707/769 |
| 2009/0036119 A1 * | 2/2009 | Smith et al. | 455/432.1 |
| 2009/0157652 A1 * | 6/2009 | Barbosa et al. | 707/5 |
| 2009/0248502 A1 * | 10/2009 | Hoff et al. | 705/14 |
| 2009/0327270 A1 * | 12/2009 | Teevan et al. | 707/5 |
| 2010/0106703 A1 * | 4/2010 | Cramer | 707/706 |
| 2011/0055185 A1 * | 3/2011 | Bitan et al. | 707/706 |
| 2012/0023126 A1 * | 1/2012 | Jin et al. | 707/769 |
| 2012/0036119 A1 * | 2/2012 | Zwicky et al. | 707/711 |
| 2012/0078710 A1 * | 3/2012 | Cramer | 705/14.43 |
| 2012/0123863 A1 * | 5/2012 | Kaul et al. | 705/14.52 |
| 2012/0246156 A1 * | 9/2012 | Gupta et al. | 707/731 |
| 2013/0246407 A1 * | 9/2013 | Gupta et al. | 707/723 |

OTHER PUBLICATIONS

Radlinski et al, "How Does Clickthrough Data Reflect Retrieval Quality?", 2008.*
Raya Fidel, "Individual Variability in Online Searching Behavior", 1985.*
White et al, "Investigating Behavioral Variability in Web Search", 2007.*
Wu et al, "An Investigation on a Community's Web Search Variability", 2008.*
U.S. Appl. No. 12/845,307, filed Jul. 28, 2010, entitled Systems and Methods for Managing Electronic Content (73 pages).
Extended European Search Report for European Application No. EP 12002029 (6 pages), mailed Oct. 15, 2012.
Alejandro Lopez-Ortiz, "Search Engines and Web Information Retrieval," CAAN 2004, LNCS 3405, pp. 183-191, Berlin Heidelberg (2005).
Bernard J. Jansen, "Search log analysis: What it is, what's been done, how to do it," Library & Information Science Research 28, pp. 407-432, University Park, Pennsylvania (2006).

* cited by examiner

*Primary Examiner* — Hung Le
(74) *Attorney, Agent, or Firm* — Finnegan, Henderson, Farabow, Garrett & Dunner

(57) ABSTRACT

Systems and methods are disclosed for evaluating the supply of electronic content on an electronic network. In accordance with one implementation, a computer-implemented method includes receiving search results history for a plurality of queries, determining a variability of the search results history for queries for at least one keyword, and determining a supply value indicative of a supply of electronic content on the electronic network relating to the at least one keyword, based on the determined search results variability. The method further includes requesting, over the electronic network, electronic content relating to the at least one keyword based on the determined supply value.

25 Claims, 9 Drawing Sheets

FIG. 4

KEYWORD ADVERTISING VALUE — 400

| KEYWORD | VALUE |
|---|---|
| ARIZONA KILLER | $0.006 |
| BRITNEY SPEARS | $0.002 |
| NEW YORK YANKEES | $0.004 |
| REFINANCE | $0.005 |

ELECTRONIC CONTENT SUPPLY TABLE — 500

| KEYWORD | TIME PERIOD | LINKS IN TOP N | # OF TIMES IN TOP N | # OF CLICKS |
|---|---|---|---|---|
| A | — | — | — | — |
| B | — | — | — | — |

502 / 506 / 508 / 504 / 510 / 512

| TOPICS | TERMS | FIND TERMS | EVENTS |

VIEW TERM DETAILS

702

ORGANIZE BY BRAND | ORGANIZE BY KEYWORD

1. GURU
2. 420
3. KIRSTEN KUTNER
4. DOROTHY HEIGHT
5. KELI MCGREGOR
6. FARRAH FORKE
7. DONNER PARTY
8. ROGER EBERT
9. SPACE SHUTTLE LANDING
10. CRYSTAL BERNARD
11. MICHAEL DOUGLAS
12. GIZMODO
13. 2010 NFL SCHEDULE
14. JAMES MITCHELL
15. PERINATOLOGIST
16. BOSTON MARATHON RESULTS
17. MEGYN KELLY
18. GOLDMANS SACHS SEC
19. CHRISTINA HENDRICKS
20. DANCING WITH THE STARS
21. COLUMBINE
22. AMY YESBECK
23. HEATHROW AIRPORT
24. QUO VADIS
25. EDWIN VALERO
26. DEADLIEST WARRIOR
27. DAIRY QUEEN
28. LORENA OCHOA
29. DHIMMITUDE
30. TRUECONFESSIONS
31. BACCARAT
32. EARTH DAY
33. COLORADO ROCKIES
34. EYAFJALLAJOKULL
35. KIRK DOUGLAS
36. KELSEY GRAMMER
37. PRESIDENT GARFIELD
38. FRANKENFURT AIRPORT

ID
EVALUATING SUPPLY OF ELECTRONIC CONTENT RELATING TO KEYWORDS

BACKGROUND

1. Technical Field

The present disclosure relates generally to evaluating the supply of content on an electronic network, such as the Internet. More specifically, and without limitation, the present disclosure relates to systems and methods for evaluating the supply of content on an electronic network pertaining to one or more keywords.

2. Background Information

Currently, newspapers, magazines, and other publishers of timely textual and visual content are increasingly competing with online websites for the public's attention. Online websites that generate content (so-called "content sites") often employ writers or bloggers to generate articles, podcasts, videos, and other content regarding topics that are popular at the moment. These content sites face challenges in generating the quantity and diversity of content desired by the public and necessary to obtain sufficient web traffic and associated advertising revenue.

Some types of online content can have a low shelf-life, in that it can be rendered out-of-date by current events or new conventional wisdom. In addition, online content faces tremendous levels of competition. While traditional media only competed against a finite number of peer publications and broadcasts, new online media faces competition from thousands, or even hundreds of thousands, of websites.

As a result of the fierce competition for online content, it is important for providers of online content to generate very large volumes of content. It can be useful to continuously generate large amounts of content about a topic to ensure that it is timely and up-to-date, as well to ensure that such content is distributed and displayed throughout the Internet, where it is likely to be consumed by online users.

At the same time, it is also important for online content providers to focus on topics or areas in which the supply for online content is inadequate. By timely introducing new content in such areas, it is more likely to be consumed by online users. As a result, the online content providers may increase the popularity of their content websites. The additional web traffic may also result in increased advertising revenue for the online content providers.

In view of the foregoing, there is a need for improved systems and methods for addressing one or more of the above-referenced challenges. Moreover, there is a need for improved systems and methods for managing electronic content based on the supply of content on an electronic network, such as the Internet.

SUMMARY

One aspect of the disclosure relates to a computer-implemented method for evaluating the supply of electronic content on an electronic network, such as the Internet. The method may include receiving search results history for a plurality of queries, and determining a variability of the search results history for queries for one or more keywords. The method may further include determining a supply value indicative of a supply of electronic content on the electronic network relating to at least one keyword, based on the determined search results variability. The method may further include requesting, over the electronic network, electronic content relating to the at least one keyword based on the determined supply value.

Another aspect of the disclosure relates to another computer-implemented method for evaluating the supply of electronic content on an electronic network. The method may include receiving search results history for a plurality of queries, and determining, based on the search results history, a variability in which search results users select for queries for at least one keyword. The method may further include determining a supply value indicative of a supply of electronic content on the electronic network relating to the at least one keyword, based on the determined variability in which results users select for queries for the at least one keyword. Finally, the method may include requesting, over the electronic network, at least one contributor to submit electronic content relating to the at least one keyword, based on the determined supply value.

A further aspect of the disclosure relates to another method for evaluating the supply of electronic content on an electronic network. The method may include receiving search results history for a plurality of queries, and determining, based on the search results history, a rate at which users abandon the queries for at least one keyword. The method may further include determining a supply value indicative of a supply of electronic content on the electronic network relating to the at least one keyword, based on the determined abandonment rate. Finally, the method may include requesting, over the electronic network, electronic content relating to the at least one keyword based on the determined supply value.

Yet another aspect of the disclosure relates to yet another computer-implemented method for evaluating the supply of electronic content on an electronic network. The method may include receiving search results history for a plurality of queries, and determining, based on the search results history, at least one of a variability of the search results history for queries for at least one keyword, a variability in which search results users select for queries for the at least one keyword, and a rate at which users abandon the queries for the at least one keyword. The method may further include determining a supply value indicative of a supply of electronic content on the electronic network relating to the at least one keyword, based on at least one of the search results variability for queries for the at least one keyword, the variability in which search results users select for queries for the at least one keyword, and the rate at which users abandon queries for the at least one keyword. Finally, the method may include making electronic content relating to the at least one keyword available on the electronic network, based on the determined supply value.

Additional aspects of the present disclosure relate to computer-implemented systems and computer-implemented media for evaluating the supply of content on an electronic network pertaining to one or more keywords, as further described herein.

Before explaining exemplary embodiments of the present disclosure, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as in the abstract, are for the purpose of description and should not be regarded as limiting.

The accompanying drawings, which are incorporated in and constitute a part of this specification, illustrate certain embodiments of the disclosure, and together with the description, serve to explain the principles of the disclosure.

As such, those skilled in the art will appreciate that the conception upon which this disclosure is based may readily be utilized as a basis for designing other structures, methods, and systems for carrying out the several purposes of the present disclosure. It is important, therefore, to recognize that the claims should be regarded as including such equivalent constructions insofar as they do not depart from the spirit and scope of the present disclosure.

BRIEF DESCRIPTION OF THE DRAWINGS

The following figures are used to describe exemplary features and embodiments related to the present disclosure. In the figures:

FIG. 4 depicts an exemplary keyword advertising value table, consistent with the disclosed embodiments;

FIG. 5 depicts an exemplary electronic content supply table, consistent with the disclosed embodiments;

FIG. 7 depicts an exemplary electronic content request web page, consistent with the disclosed embodiments;

DETAILED DESCRIPTION

Reference will now be made in detail to exemplary embodiments of the disclosure, examples of which are illustrated in the accompanying drawings. Wherever possible, the same reference numbers will be used throughout the drawings to refer to the same or like parts.

Embodiments of the present disclosure relate to managing electronic content, including online electronic content generated by users, which is often referred to as "user-generated content" ("UGC"). Electronic content may generally include any type or combination of text, images, audio, video, or computer programs. For example, electronic content may include articles, blog posts, photos, recordings, videos, music, audio tracks, software, and/or games created by anyone in the world. In one embodiment, it may be desirable for users to submit electronic content to a network where it may be analyzed, manipulated, and/or distributed throughout the Internet. Although referred to interchangeably as "electronic content," "online content," or "UGC," such content may or may not be associated with the Internet. For example, content may be created, analyzed, and/or delivered over any network, such as a mobile network, a cable television network, a satellite network, or a device network. In particular, embodiments of the present disclosure relate to identifying appropriate keywords or topics about which to provide, solicit, or request electronic content, such that the electronic content is likely to be viewed, clicked on, or otherwise consumed when the keyword is searched using an online search engine.

Figure 1:
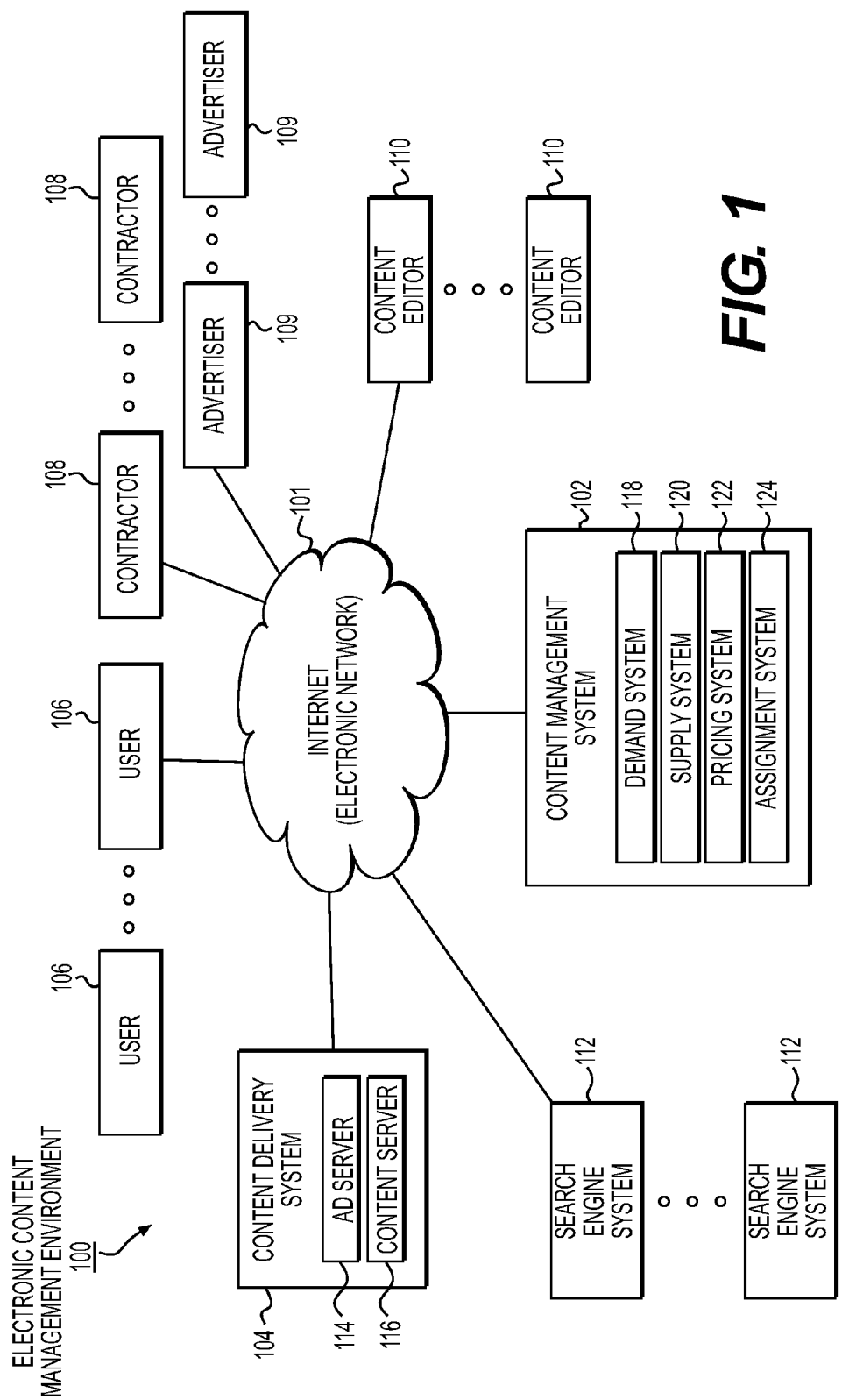
FIG. 1 depicts an exemplary system environment, consistent with the disclosed embodiments.

FIG. 1 illustrates an exemplary system environment 100, consistent with the disclosed embodiments. As further disclosed herein, environment 100 may be used to perform various methods of managing electronic content. The methods or processes performed in or with environment 100 may improve Internet users' online experiences, increase the amount and quality of relevant online content, and/or maximize network web traffic and advertising revenue.

As shown FIG. 1, environment 100 may include one or more content management systems 102, one or more content delivery systems 104, one or more users 106, one or more contractors 108, one or more content editors 110, and/or one or more search engine systems 112. As further shown in the drawing, the components of FIG. 1 may communicate with one another via an electronic network 101, such as the Internet.

Content delivery system 104 may be implemented with one or more computing systems and be associated with an entity that delivers or otherwise makes electronic content and/or advertisements available over electronic network 101, such as the Internet. For example, content delivery system 104 may be associated with an electronic content provider, an electronic advertisement provider, a search engine, an Internet Service Provider (ISP), a mobile service provider, an online retailer, or any other entity concerned with distributing electronic content and/or advertisements over electronic network 101. In one embodiment, the entity may be one that generates advertising revenue by serving the advertisements of advertisers 109 on its content web pages, like AOL®, Google®, a news company (e.g., The Washington Post®, CNN®, Fox News®), a blog site, a social networking site, or any other company that attracts the web traffic of users 106 to view content on its web pages.

In one embodiment, content delivery system 104 may include one or more advertising delivery servers 114, and one or more content delivery servers 116. Advertising delivery server 114 may control the display of advertisements to users 106 over the electronic network 101. For example, advertising delivery server 114 may include a database containing an inventory of electronic advertisements of advertisers 109. The database may also store ad campaign information, such as rule information, pricing information, user demographic information, user interest information, geographical information, and/or other information regarding presenting the stored advertisements to users 106 over electronic network 101. Based on the stored ad campaign information, on information about users 106, and/or on other information, advertising delivery server 114 may select advertisements from storage and serve the selected advertisements at desired times to desired users 106 on desired web pages, so as to maximize advertiser interests, user experiences, and/or advertising revenue.

Content delivery server 116 may control the display of electronic content at desired times to desired users 106 on desired web pages so as to maximize user experiences and/or advertising revenue. Advertising and content delivery servers 114, 116 may be configured to communicate with each other, and in some embodiments they may be fully integrated. For example, ads and content may be selectively matched in real-time based on the identify of a user 106, a website/link/content requested by the user, time of day, web history, preferences, and/or other information. For instance, content delivery server 104 may interact with ad servers or other remote web servers configured to receive advertising information from advertisers 109 and to serve ads on websites publishing electronic content. Ad servers may serve ads based on contextual targeting of websites, search results, advertiser information and/or user profile information. Such ad servers may be configured to generate behavioral logs, leadback logs, click logs, action logs, conversion logs, and/or impression logs, based on users' interactions with websites and/or ads.

Users 106, contractors 108, and editors 110 may represent any person or entity using a desktop computer, laptop computer, personal digital assistant ("PDA"), smartphone, mobile device, Internet-enabled television, automobile, or home, or any other mobile or electronic device configured to access the electronic network 101. Users 106 may or may not have an existing relationship to content management system 102. Thus, the term "user" may refer to, for example, any consumer, viewer, or visitor of a web page or website, and can also refer to the aggregation of individual users into certain groupings. References to users "viewing" content and/or ads is meant to include any presentation, whether visual, aural, tactile, or a combination thereof. In another embodiment, users 106 may be a subset of Internet users defined by their membership in a network associated with content management system 102. For example, users 106 may be provided with a username and password by which they may log-in to a network website. The network may retain a set of attributes associated with each user, in a searchable profile. The attributes may reflect the user's interests and incorporate characteristics that impact content and advertisement selection, purchasing, and/or other online behavior. Attributes may be created based on user data, such as impression history, click history, purchase history, demographic data, submission history, preferences, etc., any of which may be user-supplied.

Contractors 108 may represent any person or entity having a contractual relationship with the entity associated with content management system 102. For example, contractors 108 may be regular contributors of electronic content, such as paid writers, photographers, videographers, artists, musicians, temp workers, contract workers, and/or full-time employees of the network. Contractors 108 may contribute electronic content to the network on a regular or semi-regular basis.

Editors 110 may represent any person or entity who performs editorial tasks for content management system 102. Editors 110 may perform one or more aspects of electronic content management, such as analyzing demand for content, writing and distributing requests for electronic content (i.e., "assignments"), reviewing submitted content, and pricing content. In one embodiment, editors 110 may be in communication with content management system 102, so they may access and/or influence demand, supply, pricing, and assignment functions. Alternatively, editors 110 may be omitted, with their functions or roles performed by content management system 102 and/or by delivery system 104. In another embodiment, editors 110 may supplement and/or review content management system functions.

Advertisers 109 may represent any person or entity that desires to advertise on electronic network 101. For example, advertisers 109 may represent online retailers, online service providers, financial institutions, product manufacturers, and/or any other entity that advertises goods or services electronically over network 101. In some embodiments, advertisers 109 may create or otherwise supply electronic advertisements to content delivery system 104 for selection and presentation to users 106 over electronic network 101. Advertisers 109 may also pay the entity that owns or operates content management system 102 and/or content delivery system 104 per impression, per click, and/or per conversion associated with their electronic advertisements.

Search engine systems 112 may include one or more server computers configured to parse or crawl textual data of content web pages on electronic network 101, to index and store the textual data, and/or to search the indexed textual data based upon requests from users 106. In some embodiments, search engine systems 112 may be standalone search engines providing a home page with a "query bar" into which users 106 may type a keyword query, like AOL®, Google®, or Yahoo®. Upon receipt of a keyword query, search engine systems 112 may search through the stored indices for web pages on electronic network 101 that include, reference, and/or are tagged by the query keyword (i.e., so-called "hits"). In other embodiments, search engine systems 112 may include search engines integrated with certain websites, such as news sites, social networking sites, or a blog sites. In such an embodiment, the search engines may parse, index, and search only web pages of the particular website with which the search engines are associated. Regardless of their embodiments or implementations, search engine systems 112 may also employ conventional ranking and relevancy algorithms to determine which web page results will be most relevant to the query keyword entered by users 106, and may return search results as a list of hits, including a Uniform Resource Locator (URL) link directing users 106 to each web page hit, in a sequence based on relevancy.

Search engine systems 112 may maintain and store search results history, for example, in an associated memory or data storage device. When a user 106 provides a keyword query to a search engine system 112, it may update the search results history with an entry containing information regarding the query, as well as the search results returned to the user 106.

Figures 2, 3:
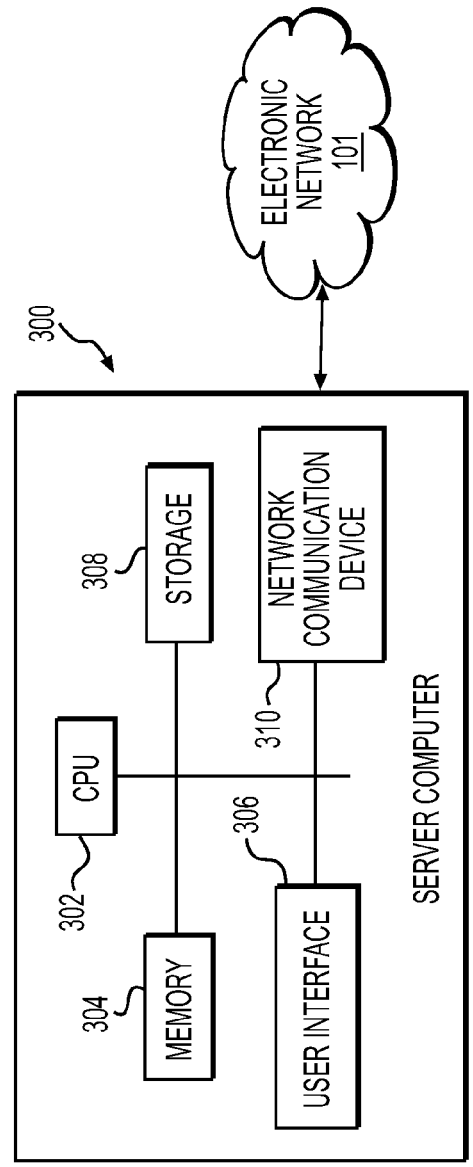
FIG. 2 depicts exemplary search results history, consistent with the disclosed embodiments.
FIG. 3 depicts an exemplary server computer, consistent with the disclosed embodiments.

FIG. 2 illustrates an exemplary search results history 200 that may be maintained by any one of search engine systems 112. Search results history 200 may be embodied, for example, as a table, a spreadsheet, a text file, a markup language file, metadata, a relational database, or any other data structure known in the art.

In one embodiment, search results history 200 may include a plurality of query entries 202, each containing information regarding a specific keyword query provided by a user 106 to search engine system 112. For example, a query entry 202 may represent a particular instance of a query for the keyword "refinance." As illustrated in FIG. 2, each query entry 202 may contain an associated search ID 204, time 206, keyword 208, result links 1-N 210, and clicked link 212 for the keyword query.

Search ID 204 may include any information uniquely identifying the specific keyword query corresponding to the query entry 202. For example, search ID 204 may be a Universally Unique Identifier (UUID), a code, and/or another piece of information that uniquely identifies the keyword query.

Time 206 may indicate the time of day and date at which the keyword query corresponding to the entry 202 was received by search engine system 112. For instance, time 206 may be a timestamp given by search engine system 112 to the keyword query (e.g., 1:15:01:12 AM).

Keyword 208 may indicate the text of the keyword query corresponding to the query entry 202. That is, keyword 208 may indicate the actual text entered by the user 106 into the "query bar" of the search engine interface. For example, keyword 208 may indicate "refinance," "Arizona killer," "Gulf oil spill," "refinance," or another keyword query input by users 106.

Results links 1-N 210 may include the top N (e.g., 3, 5, 10, or 20) results returned to the user 106 by search engine system 112 in response to the keyword query based on the search engine algorithm. In one embodiment, result links 1-N 210 may include the Uniform Resource Locators (URLs) of the hyperlinks displayed to the user 106 as search results in response to the keyword query. It is to be appreciated that the number of results links 1-N 210 maintained and stored in search results history 200 for each query may depend upon the particular configuration and/or implementation of search engine system 112.

Clicked link 212 may identify which link (i.e., URL) the user 106 actually clicked from the results of the keyword query. For example, clicked link 212 may indicate "www.mlb.com/yankees" if the user 106 clicked on the official home page of the New York Yankees in response to a keyword query for "New York Yankees." Clicked link 212 may also indicate whether the user 106 selected none of the links from the results of the keyword query; that is, whether the user 106 "abandoned" the query entirely.

Referring again to FIG. 1, content management system 102 may be associated with an entity that disseminates, publishes, generates, manages, or otherwise makes electronic content available over electronic network 101, such as the Internet. For example, content management system 102 may be associated with a content provider, a content publisher, a content creator, a search engine company, an Internet Service Provider (ISP), a mobile service provider, an online retailer, or any other entity concerned with providing electronic content over a network. In one embodiment, the entity may be one that generates advertising revenue by serving the electronic advertisements of advertisers 109 on its content web pages, like Aol®, Google®, a news company (e.g., The Washington Post®, CNN®, Fox News®), a blog site, a social networking company, or any other company that attracts the web traffic of users 106 to view content on its web pages. In some embodiments, the same entity may own or control both control content management system 102 and content delivery system 104.

Content management system 102 may include one or more server computers connected to electronic network 101. As shown in the exemplary embodiment of FIG. 3, each server computer 300 may include any combination of computing elements configured to perform content management processes, consistent with embodiments of the present disclosure. For example, each server computer 300 may include a central processing unit ("CPU") 302, a memory 304, a user interface 306, a data storage device 308, a network communication device 310, and/or any other computing elements known in the art.

CPU 302 may include one or more hardware computer microprocessors for processing data according to a set of programmable instructions or software stored in memory 304 to perform the disclosed processes of content management system 102. The functions of each processor may be provided by a single dedicated processor or by a plurality of processors. In addition, each processor may be a general-purpose processor or a special-purpose microprocessor configured to perform the disclosed functions of content management system 102.

Memory 304 may include any type of random-access memory (RAM) or read-only memory (ROM) embodied in a physical computer-readable storage medium. Memory 304 may contain computer program instructions which, when executed by CPU 202, cause the CPU to perform the disclosed processes of content management system 102.

Storage device 308 may include any type of mass data storage device known in the art. For example, storage device 308 may include a magnetic storage device such as floppy disk, hard disk, or magnetic tape; a semiconductor storage device such as solid state disk (SSD) or flash memory; an optical disc storage device such as a CD-ROM or DVD-ROM; and/or a magneto-optical disc storage device.

User interface 306 may include any type or combination of computer input/output devices known in the art. For example, user interface 306 may include a display device, a keyboard, a touch screen, a mouse, a microphone, a speaker, a printer, an accelerometer, and/or any other device known in the art providing input/output to a user of a computing device. Network communication device 310 may include any type or combination of network communication devices for communicating data over electronic network 101.

Generally, content management system 102 may be configured to identify keywords or topics about which electronic content should be generated, based on various factors. Content management system 102 may further facilitate creating, requesting, and/or soliciting the creation of electronic content relating to the identified keywords. In one embodiment consistent with the disclosure, content management system 102 may include a content demand system 118, a content supply system 120, a content pricing system 122, and/or a content assignment system 124, as illustrated in FIG. 1. Embodiments of these components are further disclosed below.

Demand system 118 may be configured to determine a demand of users 106 for electronic content associated with various keywords or topics. In one embodiment, demand system 118 may have a construction and functionality similar to the demand system described in application Ser. No. 12/854,307 by Eric Passmore et al., entitled "Systems and Methods for Managing Electronic Content" and filed on Jul. 28, 2010 ("the '307 application"), which is incorporated herein by reference in its entirety. For example, demand system 106 may determine the demand of users for articles and stories about "Arizona shooting," "New York Yankees," "refinance," and "Pilates." In one embodiment, demand system 106 may receive log data of activities of users 106 on electronic network 101, and may determine a demand for electronic content associated with the keywords or topics based on the log data. For example, demand system 118 may receive search engine query logs, ad impression, click, or conversion logs, proxy logs, web browser toolbar logs, and/or social network feeds associated with users 106 from various sources on electronic network 101. Based on the frequency or volume in which the log data contains, references, or otherwise implicates the keywords (e.g., over a period of time), demand system 118 may determine the demand of users 106 for electronic content about topics concerning the keywords. In some embodiments, demand system 118 may also filter the log data based on one or more aspects of the user activities, aggregate the filtered log data by day or time, and calculate demand trends for electronic content associated with the keywords based on a rate of change of the activities.

Demand system 118 may be further configured to determine and set an advertising value $V_{Advertising}$ of the keywords based on the demand associated with the keywords. In one embodiment, advertising value $V_{Advertising}$ may correspond to an amount the entity associated with demand system 114 charges advertisers 109 to serve advertisements associated with the keywords on its content web pages. For example, using methods known in the art, demand system 118 may determine a cost-per-impression (CPM), a cost-per-click, a cost-per-conversion, or other advertising value $V_{Advertising}$ for each keyword, in view of the demand for electronic content associated with the keywords and its available advertising base. As shown in the exemplary embodiment of FIG. 4, demand system 118 may store and maintain an advertising value table 400, for example, in storage device 308. In one embodiment, table 700 may include a plurality of keywords 402 and advertising values 404 $V_{advertising}$ corresponding to the keywords 402. Demand system 118 may also periodically or continuously update the advertising values 404 $V_{advertising}$ based on a current demand, a projected demand, and/or a trending demand for electronic content associated with the keywords 402.

Consistent with the disclosed embodiments, supply system 120 may be configured to determine certain metrics, as discussed below, regarding the supply of content on electronic network 101 pertaining to certain keywords. In some configurations, to determine these supply metrics, supply system 120 may prepare or reference a electronic content supply table 500 based on search results history 200, as shown in FIG. 5. For example, content management system 102 may have a contract, account, or other agreement in place to periodically receive or access search results history 200 from search engine system 112. In embodiments where the same entity owns or operates both content management system 102 and search engine system 112, such an agreement may be unnecessary, as content management system 102 may already have access to search results history 200. Supply system 120 may store electronic content supply table 500, for example, in memory 304 and/or in storage device 308, and may continuously or periodically electronic content supply table 500 as additional search results history 200 becomes available.

As shown in FIG. 5, electronic content supply table 500 may contain content supply information associated with one or more keywords 502. In the example shown, table 500 is truncated and contains supply information for two keywords 502—keywords A and B. But it is to be appreciated that table 500 may contain supply information regarding any number of keywords 502, depending upon the particular implementation. For example, demand system 118 may identify keywords for which the demand for electronic content exceeds a certain threshold. And supply system 120 may analyze search results history 200 to identify and extract information regarding queries for the identified keywords, in connection with determining information about the supply of electronic content pertaining to the keywords. It is contemplated, however, that supply system 120 may use other methods to determine which keywords 502 to include in table 500.

Consistent with the disclosed embodiments, electronic content supply table 500 may contain supply-related information 504 for electronic content associated with keywords 502 across one or more time periods 506. For example, supply system 120 may divide the queries for keywords 502 by hour, by day, by month, by year, etc. Although in FIG. 5 table 500 is truncated and divided into only two time periods 506 (e.g., two days), it is contemplated that table 500 may divide the queries for keywords 502 across any number of distinct time periods 506. In one embodiment, the supply-related information 504 may include links in the top N results 508, a number of times in the top N, and a number of clicks 512.

Links in the top N results 508 may identify each link returned by search engine system 112 in the top N results in response to queries for keyword 502 received during the time period 506. For example, links in the top N results 508 may include a reference to every URL returned by search engine system 112 as a top-10 result in response to queries for "refinance" on Jan. 13, 2011.

Number of times in the top N 510 may specify the number of times each link in the top N results 508 actually appeared in the top N results 508 during the time period 506. For example, where N=10, table 500 may specify the number of times search engine system 112 listed "www.bankrate.com" in the top-10 results for queries for "refinance" on Jan. 13, 2011.

Number of clicks 512 may identify the number of times that each link in the top N results 508 was actually clicked by a user 106 during the time period 506. For example, where N=10, table 500 may indicate how many times users 106 clicked "www.bankrate.com"—a top-10 result—when served by search engine system 112 in response to queries for "refinance" on Jan. 13, 2011.

Consistent with the disclosed embodiments, supply system 120 may determine a search results variability $V_{Results}$, a click results variability $V_{Click}$, and an abandonment rate $R_{Abandonment}$ using the information contained in table 500. Alternatively, supply system 120 may calculate these values directly from search results history 200, without using the information in table 500, and table 500 may be omitted. The description of table 500 above is intended to assist in illustrating concepts of the disclosure, including the concepts of search results variability $V_{Results}$, click results variability $V_{Click}$, and abandonment rate $R_{Abandonment}$, rather than to limit the disclosure to any particular embodiment.

Search results variability $V_{Results}$ may represent a variability of the search results (i.e., links) returned by search engine system 112 in response to queries from users 106 for keywords 502. As used herein, search results variability $V_{Results}$ refers to the unpredictability or inconsistency of the links returned by search engine system 112 in response to queries for a particular keyword 502, such as "refinance." In one embodiment, supply system 120 may determine the search results variability $V_{Results}$ for queries for a keyword 502 as follows:

$$V_{Results} = \text{Links}_{Top\ N} / (\text{Queries}_{Total} \times N), \quad (1)$$

where $V_{Results}$ is a number between 0 and 100% representing the variability of the search results for queries for the keyword 502 during the time period 506, $\text{Links}_{Top\ N}$ is the number of unique links appearing in the top N results 508 the queries for the keyword 502 during the time period 506, $\text{Queries}_{Total}$ is the total number of queries for the keyword 502 during the time period 506, and N is an integer. As an example, assume that N=10 and that search engine system 112 returned 50 unique links in the top 10 results in response to 200 queries for "refinance" on Jan. 13, 2011. In this case, the search results variability $V_{Results}$ would be 50/(200×10)=2.5%. A search results variability of 2.5% is very low, meaning that search engine system 112 returned essentially the same handful links every time users 106 queried "refinance" on Jan. 13, 2011. It is contemplated that other methods for calculating the search results variability $V_{Results}$ may be used.

Search results variability $V_{Results}$ may indicate characteristics about the supply of electronic content on electronic network 101 relating to the keyword 502. For example, if the search results variability $V_{Results}$ of the search results is high, and search engine system 122 returns different links each time a user 106 queries the keyword 502, this may indicate that no one piece or source of electronic content is meeting the demand for electronic content pertaining to the keyword 502. At the same time, a high search results variability $V_{Results}$ may indicate an opportunity for content management system 102 to introduce new electronic content relating to the keyword that has a high likelihood of being served by search engine system 112 and, thus, consumed by users 106.

If the search results variability $V_{Results}$ is low, on the other hand, and search engine system 122 returns the same few links each time a user 106 queries the keyword 502, this may suggest that a few pieces or sources of electronic content are meeting the demand for electronic content pertaining to the keyword 502. A low search results variability $V_{Results}$ may further suggest that new electronic content in this space is unlikely to be served by search engine system 112 and consumed by users 106. For example, if search engine system 112 always returns "www.mlb.com/yankees," "www.espn.com/yankees," "www.wikipedia.com/yankees," and "www.nydailynews.com/yankees" in the top N results when users 106 query "New York Yankees," this may suggest that these few sources are supplying the demand for electronic content pertaining to the New York Yankees, and that newly introduced content about the New York Yankees is unlikely to be served and consumed by users 106.

Supply system 120 may similarly calculate the search results variability $V_{Results}$ of queries for the keyword 502 across any remaining time periods 506, as described above. Supply system 120 may then determine a time-adjusted search results variability $V_{Results\text{-}Time}$ as follows:

$$V_{Results\text{-}Time} = V_{Results\text{-}1} \times W_1 + V_{Results\text{-}2} \times W_2 \ldots + V_{Results\text{-}M} \times W_M, \quad (2)$$

where $V_{Results\text{-}Time}$ is a number between 0 and 100% representing the total or combined variability of the search results for queries for the keyword 502 adjusted across all time periods 506, $V_{Results\text{-}M}$ is a number between 0 and 100% representing the variability of the search results for queries for the keyword 502 during a specific time period M, and $W_M$ is a time-weight factor between 0 and 100% that corresponds to that specific time period M.

It is to be appreciated that more recent queries for the keyword 502 may be more relevant for determining characteristics of the supply of electronic content relating to the keyword 502. Thus, in some embodiments, supply system 120 may weigh the search results variability $V_{Results\text{-}M}$ for recent time periods M heavier than the search results variability $V_{Results\text{-}M}$ for older time periods M. For example, supply system 102 may calculate the time-adjusted search results variability $V_{Results\text{-}Time}$ based on the search results variability $V_{Results\text{-}M}$ for queries for the keyword 502 for each of three different time periods 506: today, yesterday, and the day before yesterday. And the time-weight factor $W_1$ for queries today may be 70%, the time-weight factor $W_2$ for queries yesterday may be 30%, and the time-weight factor $W_3$ for queries the day before yesterday may be 10%. But it is to be appreciated that supply system 102 may take into consideration queries for keywords across any number of distinct time periods M to calculate the time-adjusted search results variability $V_{Results\text{-}Time}$ and may use any desired time-weight factors $W_M$ for these time periods M.

Click results variability $V_{Click}$ may represent a variability in the links that users 106 actually click 106 in the search results for queries for keywords 502. In other words, click results variability $V_{Click}$ may represent a degree to which users 106 click on the same (or different) links in the search results for queries for a keywords 502, regardless of which links search engine system 112 displays in the search results, the order in which search engine system 112 presents the links, the number of results, and/or other factors. In one embodiment, supply system 120 may determine the click results variability $V_{Click}$ for queries for a keyword 502 as follows:

$$V_{Click} = (\text{Queries}_{Total} - \sqrt{\text{Sum}_{Clicks\ Squared}})/\text{Queries}_{Total}. \quad (3)$$

In the above equation, $V_{Click}$ is a number between 0 and 100% representing the variability in which links users 106 actually click 106 in the search results for queries pertaining to keywords 502 during the time period 506, $\text{Queries}_{Total}$ is the total number of queries for the keyword 502 during the time period 506, and $\text{Sum}_{Clicks\ Squared}$ is the sum of the squares of the total number of times users 106 clicked each unique link search engine system 112 displayed in the top N results 508 in response to queries for the keyword 502 during the time period 506.

As an example, assume N=10 and search engine system 112 displayed 15 unique links in the top 10 results in response to 100 queries by users 106 for the keyword "refinance" on Jan. 15, 2011, and that the 15 links were clicked as follows.

| Link | # Clicks |
|---|---|
| Bankrate.com | 25 |
| Wikipedia.com/refinance | 20 |
| Mortgage.com | 5 |
| Mortagefit.com | 1 |
| BankofAmerica.com | 8 |
| INGdirect.com | 5 |
| WellsFargo.com | 11 |
| Wachovia.com | 0 |
| Quickenloans.com | 3 |
| LendingTree.com | 4 |
| Bloomberg.com | 0 |
| SunTrust.com | 1 |
| Refinance.com | 2 |
| Loanmodification.com | 1 |
| Mortgageloan.com | 3 |

In this example, the click results variability $V_{Click}$ would be $(100 - \sqrt{(25^2 + 20^2 + 5^2 + 1^2 + 8^2 + 5^2 + 11^2 + 0^2 + 3^2 + 4^2 + 0^2 + 1^2 + 2^2 + 1^2 + 3^2)})/100 = 64\%$. A click results variability $V_{Click}$ of 64% is fairly high, meaning that users 106 clicked a variety of different links in the search results for queries for "refinance" on Jan. 13, 2011, with no obvious skew to a single link or only a few different links. But it is contemplated that other methods for calculating the click results variability $V_{Click}$ may be employed.

Click results variability $V_{Click}$ may also indicate characteristics about the supply of electronic content on electronic network 101 relating to the keyword 502. For example, if the click results variability $V_{Click}$ is high (i.e., closer to 100%), and users 106 click different links each time they query the keyword 502, this may indicate that no one piece or source of electronic content is adequately supplying the demand for electronic content pertaining to the keyword 502. At the same time, a high click results variability $V_{Click}$ may indicate an opportunity for content management system 102 to introduce new electronic content relating to the keyword that has a high likelihood of being clicked on and consumed by users 106, if served by search engine system 112 as a query result for the keyword.

If click results variability $V_{Click}$ is low, on the other hand, and users 106 click on the same link or links each time they query the keyword 502, this may suggest that a few pieces or sources of electronic content are supplying the demand for electronic content pertaining to the keyword 502. A low click results variability $V_{Click}$ may further suggest that new electronic content in this space is unlikely to be clicked and consumed by users 106, even if search engine system 112 serves the new electronic content as a query result for the keyword 502. For example, users 106 invariably click "www.mlb.com/yankees" or "www.espn.com/yankees" when querying "New York Yankees," this may suggest that these few sources are supplying the demand for electronic content pertaining to the New York Yankees, and that newly introduced content about the New York Yankees is unlikely to be clicked and consumed by users 106.

Supply system 120 may similarly calculate the click results variability $V_{Click}$ of queries for the keyword 502 for any remaining time periods 506, as described above. Supply system 120 may then determine a time-adjusted click results variability $V_{Click-Time}$ for the keyword 502 as follows:

$$V_{Click-Time} = V_{Click-1} \times W_1 + V_{Click-2} \times W_2 \ldots + V_{Click-M} \times W_M, \quad (4)$$

where $V_{Click-Time}$ is a number between 0 and 100% representing the total or combined variability in the links users 106 click for queries for the keyword 502 adjusted across all time periods 506, $V_{Click-M}$ is a number between 0 and 100% representing the variability in which links users 106 clicked for queries for the keyword 502 during a particular time period M, and $W_M$ is the time-weight factor between 0 and 100 corresponding to that particular time period M, discussed above in connection with the search results variability $V_{Results}$.

Abandonment rate $R_{Abandonment}$ represents a rate at which users 106 abandon entirely queries for the keyword 502 during one or more time periods 506. As used herein, "abandonment" is when a user 106 inputs a query for a keyword 502 into search engine system 112, but does not click on any results provided by search engine system 112. For example, an abandonment occurs when a user 106 submits a query for "refinance" but, instead of clicking on any of the links returned by search engine system 112, the user 106 submits a new keyword query, such as for "mortgage". In one embodiment, supply system 120 may determine the abandonment rate $R_{Abandonment}$ for queries for a keyword 502 as follows:

$$R_{Abandonment} = (\text{Queries}_{Total} - \text{Clicks}_{Total})/(\text{Queries}_{Total}), \quad (5)$$

where $R_{Abandonment}$ is a number between 0 and 100% representing the abandonment rate $R_{Abandonment}$ for queries for the keyword 502 during the time period 506, $\text{Queries}_{Total}$ is the total number of queries for the keyword 502 during the time period 506, and $\text{Clicks}_{Total}$ is the total number of times users 106 clicked a link in the query results for the keyword 502 during the time period 506 (i.e., the number of queries for keyword 502 for which users 106 selected any link in the query results). As an example, assume that search engine system 112 received 2000 queries for "refinance" on Jan. 13, 2011, and users 106 clicked links in the query results for only 1100 of those queries. In this case, the abandonment rate $R_{Abandonment}$ would be (2000−1100)/2000=45%, meaning that 45% of the time users 106 abandoned queries for this keyword. But it is contemplated that other methods for determining the abandonment rate $R_{Abandonment}$ may be employed.

Abandonment rate $R_{Abandonment}$ may also indicate characteristics about the supply of electronic content on electronic network relating to the keyword 502. For example, if the abandonment rate $R_{Abandonment}$ is high (i.e., closer to 100%), and users 106 are not clicking any query results served by search engine system 112 when they query the keyword 502, this may indicate an insufficient supply for electronic content pertaining to the keyword 502. At the same time, a high abandonment rate $R_{Abandonment}$ may indicate an opportunity for content management system 102 to introduce new electronic content relating to the keyword 502 that has a high likelihood of being clicked on and consumed by users 106, if served by search engine system 112 as a query result for the keyword 502.

If the abandonment rate $R_{Abandonment}$ is low, on the other hand, and users 106 usually click query results served by search engine system 112 for the keyword 502, this may suggest that the users 106 are satisfied with the supply of electronic content pertaining to the keyword 502 (i.e., the supply for electronic content pertaining to the keyword 502 is meeting the demand). A low abandonment rate $R_{Abandonment}$ may further suggest that new electronic content in this space is unlikely to be clicked and consumed by users 106, even if search engine system 112 serves the new electronic content as a query result for the keyword 502.

Supply system 120 may similarly calculate the abandonment rate $R_{Abandonment}$ of queries for the keyword 502 for any remaining time periods 506, as described above. Supply system 120 may then determine a time-adjusted abandonment rate $R_{Abandonment-Time}$ as follows:

$$R_{Abandonment-Time} = R_{Abandonment-1} \times W_1 + R_{Abandonment-2} \times W_2 \ldots + R_{Abandonment-M} \times W_M, \quad (6)$$

where $R_{Abandonment-Time}$ is a number between 0 and 100% representing the total rate at which users 106 abandon queries for the keyword 502 across all time periods 506, $R_{Abandonment-M}$ is a number between 0 and 100% representing the rate at which users 106 abandon queries for the keyword 502 during a particular time period M, and $W_M$ is the time-weight factor between 0 and 100 for that particular time period M, discussed above in connection with the search results variability $V_{Results}$ and the click results variability $V_{Click}$.

In addition, supply system 120 may be configured to calculate a total supply adjustment $\text{Supply}_{Adjustment}$ of the keyword 502 based on the time-adjusted search results variability $V_{Results-Time}$, the time-adjusted click results variability $V_{Click-Time}$, and the time-adjusted abandonment rate $R_{Abandonment-Time}$ as follows:

$$\text{Supply}_{Adjustment} = ((V_{Results-Time} \times W_{Results} + V_{Click-Time} \times W_{Click} + R_{Abandonment-Time} W_{Abandonment})/(W_{Results} + W_{Click} + W_{Abandonment}), \quad (7)$$

where $\text{Supply}_{Adjustment}$ is a number between 0 and 100% representing the adjusted supply of electronic content on electronic network 101 pertaining to the keyword 502, taking into consideration the time-adjusted search results variability $V_{Results-Time}$, the time-adjusted click results variability $V_{Click-Time}$, and the time-adjusted abandonment rate $R_{Abandonment-Time}$, and $W_{Results}$, $W_{Click}$, and $W_{Abandonment}$ are weighting factors for the search results variability $V_{Results}$, click results variability $V_{Click}$, and abandonment rate $R_{Abandonment}$, respectively. For example, in one embodiment, an administrator or engineer of content management system 102 may determine that abandonment rate $R_{Abandonment}$ is the most important characteristic for evaluating the supply of electronic content pertaining to the keyword 502, search results variability $V_{Results}$ is the second-most important characteristic for evaluating the supply of electronic content pertaining to the keyword 502, and click results variability $V_{Click}$ is the third-most important characteristic for evaluating the supply of electronic content pertaining to the keyword 502, and may thus assign $W_{Abandonment}=40\%$, $W_{Results}=30\%$, and $W_{Click}=30\%$. But it is contemplated that other values or ways to weigh the search results variability $V_{Results}$, click results variability $V_{Click}$, and abandonment rate $R_{Abandonment}$ may be used. In addition, other methods of calculating the supply adjustment $\text{Supply}_{Adjustment}$ of the keyword 502 may be used.

Supply system 120 may be further configured to determine a supply-adjusted value $V_{supply-Adjustment}$ for the keyword 502 based on the advertising value $V_{Advertising}$ of the keyword 502 and on the supply adjustment $\text{Supply}_{Adjustment}$ of the keyword 502 as follows:

$$V_{Supply-Adjustment} = \text{Supply}_{Adjustment} \times V_{Advertising}, \quad (8)$$

where $V_{supply-Adjustment}$ is a value (e.g., in U.S. currency) representing the supply-adjustment value $V_{Supply-Adjusted}$ of the keyword 502, $\text{Supply}_{Adjustment}$ the supply adjustment (e.g., a percentage) of the keyword 502, and $V_{Advertising}$ is a value (e.g., in U.S. currency) representing the advertising value 402 of the keyword, determined from table 400.

Returning to FIG. 1 pricing system 122 may be configured to evaluate electronic content or proposed electronic content and to calculate the value of the electronic content. In one embodiment, pricing system 122 may have a similar construction and/or functionality as the pricing system described in the '307 application. Based on the value of the electronic content, pricing system 122 may be configured to determine how much money to pay to contractors 108 or users 106 to create or otherwise provide the electronic content.

Assignment system 124 may be configured to determine whether the electronic content should be generated by contractors 108, users 106, or both contractors 108 and users 106. In one embodiment, assignment system 124 may have a similar construction and/or functionality as the assignment system described in the '307 application. Assignment system 124 may also be configured to determine to which particular contractor(s) or user(s) the electronic content should be assigned, and/or which particular contractors or users should be solicited to create the electronic content.

Figure 6:
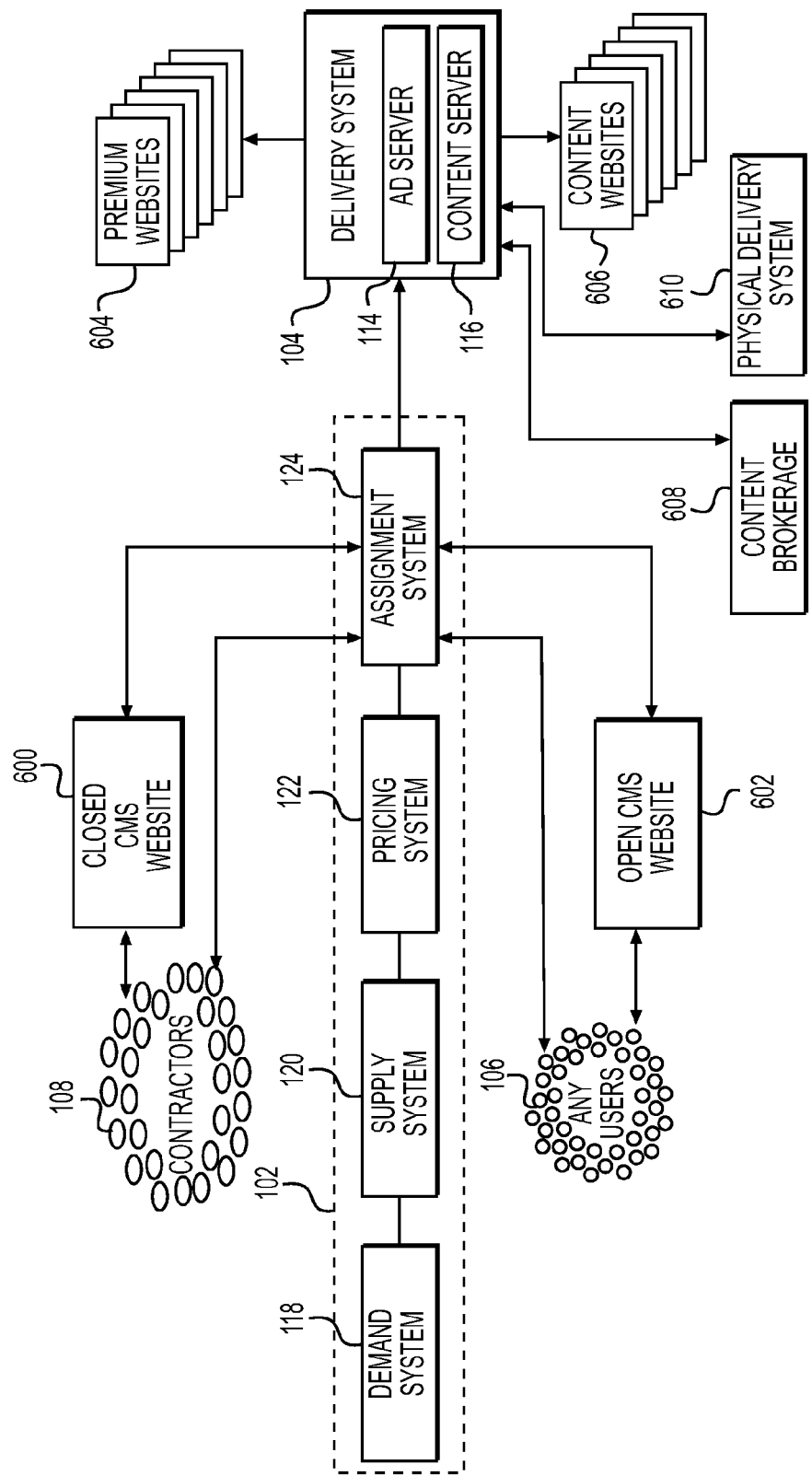
FIG. 6 depicts a flow diagram concerning exemplary systems for managing electronic content, consistent with the disclosed embodiments.

FIG. 6 depicts a flow diagram concerning content management system 102 and content delivery system 104. Generally, contractors 108 may interact with a closed content management system website 600, which is accessible only to contractors 108 and editors 110. Users 106 may interact with an open content management system website 602, which is accessible by anyone with a connection to electronic network 101. Websites 600, 602 may be part of, and facilitate human interaction with other components of, content management system 102, including demand system 118, supply system 120, pricing system 122, and/or assignment system 124.

In the exemplary embodiment of FIG. 6, demand system 118 may determine the demand for electronic content associated with certain keywords, for example, using one or more methods described in the '307 application. Demand system 118 may also receive or determine keyword advertising values 404 associated with the keywords. As mentioned above, demand system 118 may determine this information by receiving raw log data of Internet user activities, filtering the log data based on one or more aspects of the activities, aggregating the filtered log data by day or time, and calculating trends in the aggregated log data based on a rate of change of the activities.

If the demand associated with a keyword is above a demand threshold, demand system 118 may request supply system 120 to determine characteristics relating to the supply of electronic content on electronic network 101 pertaining to the keyword. Supply system 120 may then determine, among other things, the supply-adjustment value $V_{Supply\text{-}Adjustment}$ for the keyword, as described above. If the supply-adjustment value $V_{Supply\text{-}Adjustment}$ for the keyword is above a supply threshold, supply system 120 may request pricing system 122 to determine a price for electronic content pertaining to that keyword.

Pricing system 122 may calculate the worth of electronic content, for example, using one or more methods described in the '307 application. For instance, pricing system 1122 may calculate how much the electronic content would be worth if generated by contractors 108 or users 106, based on the type of electronic content, the subject matter, the topic, requested quality or characteristics, and/or proposed contributor, the advertising value 404 of any keywords associated with the electronic content, the demand for the electronic content, the supply-adjustment value $V_{supply\text{-}Adjustment}$ for the keyword 502, and/or other factors. Pricing system 122 may then request assignment system 124 to assign the electronic content to one or more contractors 108 and/or users 110 for creation. In some embodiments, pricing system 122 may evaluate electronic content again once it is submitted by the contractors 108 and/or users 106, or only after it is submitted, to ensure that the electronic content is of sufficient quality.

Assignment system 124 may also determine whether the electric content pertaining to the keyword should be generated by contractors 108, by users 108, or by both contractors and users, for example, using one or more methods described in the '307 application. In one embodiment, assignment system 124 may post requests for electronic content to closed content management system website 600, to open content management system websites 602, or to both, where people can view the content requests. In this regard, FIG. 7 illustrates an exemplary electronic content request page 700 of website 600 or 602. As shown in the drawing, page 700 may include a list 702 of keywords content management system 102 has identified and about which content management system 102 requests contributors to create and submit electronic content.

Alternatively or additionally, assignment system 124 may identify the particular contractor(s) or user(s) to which to send electronic content requests. For example, assignment system 124 may generate and send requests for electronic content directly to one or more contractors 108 or users 106, via telephone, facsimile, email, SMS or MMS text message, social networking message, VOIP, website, podcast, chat room, message board, listserv, media stream, electronic broadcast, and/or any other desirable communication method. In some embodiments, assignment system 124 may send the electronic content requests to contributors as specified in contributor profiles maintained by assignment system 124.

Contractors 108 and users 106 may be generally referred to as "contributors." Consistent with embodiments of the present disclosure, contributors may be asked to generate electronic content pertaining to identified keywords (e.g., "refinance") in response to content requests from content management system 102. For example, contributors may write or prepare articles, stories, blog posts, reviews, books, or other information. They may also create photographs, artwork, audio, music, videos, links, software, websites, or any other multimedia. Contributors may upload or otherwise submit the content they create via the closed and open content management system websites 600, 602, depending on whether they are users 106 or contractors 108.

As shown in FIG. 6, and as described in the '307 application, electronic content submitted by contributors (106, 108) through content management system 102 may be passed to delivery system 104, where it may be further evaluated, matched with desired advertisements and/or campaigns, and then distributed onto websites where it may be displayed to anyone browsing electronic network 101. Delivery system 104 may also deliver advertising and content directly over any other type of electronic network, such as a mobile phone network, television network, satellite network, or device network.

In one embodiment, delivery system 104 may distribute content either to premium websites 604 or content websites 606. Premium websites 604 may be websites that receive a large volume of traffic (i.e., clicks, views, impressions). For example, premium websites 604 may include sites referenced by or incorporated in a web portal or search engine. Premium websites 604 may also include popular blogs that have relatively high name recognition and site traffic. By contrast, content websites 606 may include a collection of content web pages that are generally less well-known and less visited. In one embodiment, electronic content may be distributed first to one or more content websites 606, where user response thereto is evaluated, and then it may be moved to one or more premium websites 604 if it surpasses a minimum threshold of popularity. Advertisements may be matched with electronic content on any website 604, 606, based on subject matter, timing, etc. Contributors may receive a portion of advertising revenue associated with advertisements displayed with the contributors' submitted content.

In one embodiment, delivery system 104 may also or alternatively distribute electronic content through a content brokerage 608, which may be an electronic platform for offering, bidding on, licensing, and/or purchasing electronic content in a free-market environment. Delivery system 104 may also distribute electronic content to traditional physical delivery systems 610, such as newspaper, magazine, or other periodical circulation systems.

Figure 8:
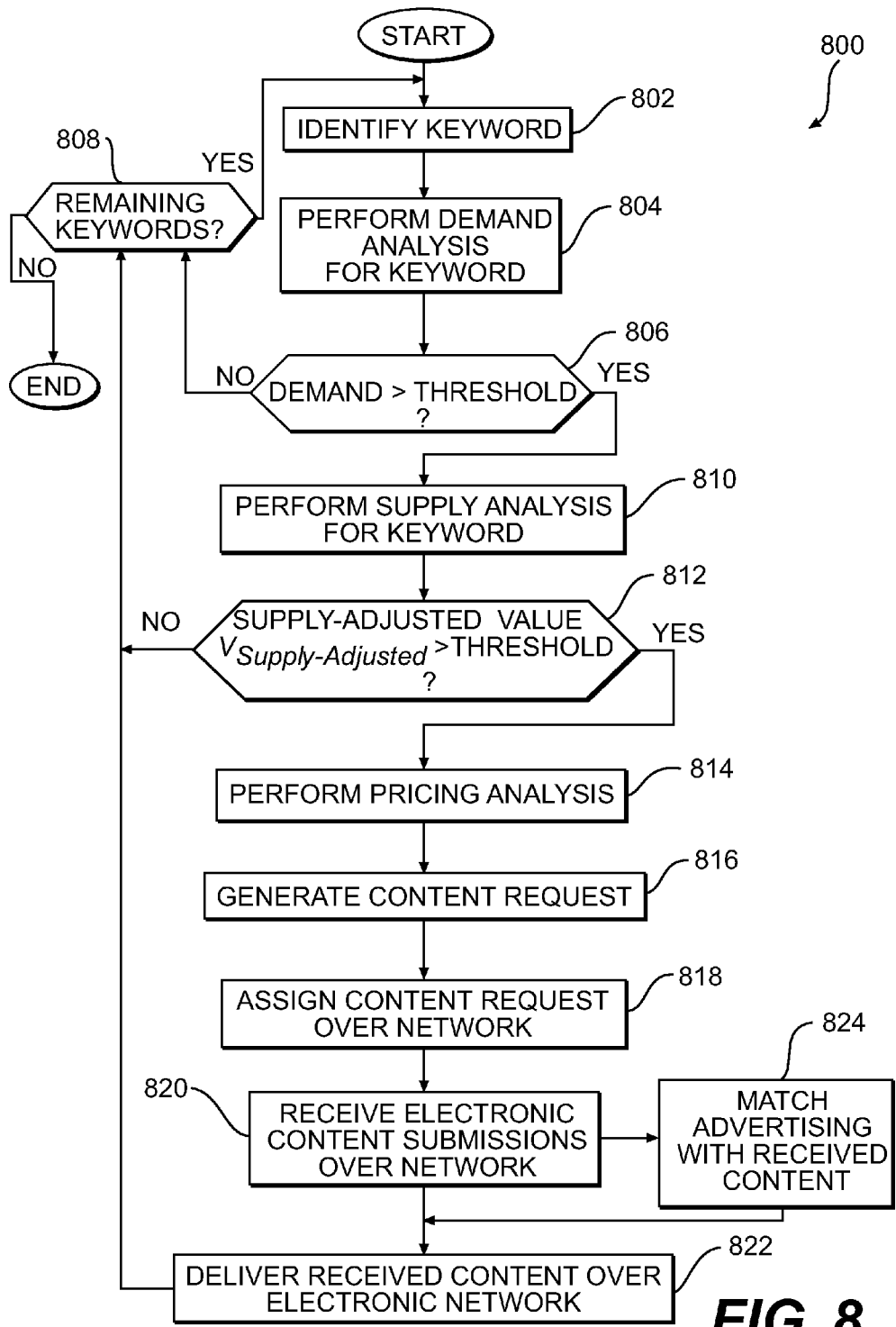
FIG. 8 depicts a flow diagram of an exemplary method for managing electronic content, consistent with the disclosed embodiments.

FIG. 8 depicts a flow chart of one such exemplary method 800 for managing online content. In one embodiment, method 800 may be performed by CPU 302 of a server computer 300 associated with content management system 102, executing computer program instructions stored in memory 304.

Method 800 may include identifying at least one keyword (step 802). For example, content management system 102 may select a keyword (e.g., "refinance," "Arizona killer," "dolphin," etc.) from a predetermined list of keywords.

Method 800 may also include performing a demand analysis for the keyword identified in step 802 (step 804). For instance, demand system 118 may analyze information from web traffic, user behavior/preferences, search results history 200, impression, click, and/or conversion logs, proxy logs, toolbar logs, social networking feeds, external sources, etc., as described above, to determine demand of users 106 for electronic content associated with the keyword. The demand may be determined as a monetary value (e.g., CPM value), a keyword frequency, a demand volume, and/or any other suitable demand metric indicative of the demand of users 106 for electronic content pertaining to the keyword.

Method 800 may also include determining whether the demand for electronic content associated with the keyword determined in step 804 is greater than a certain demand threshold (step 806). For example, demand system 118 may determine whether the demand is greater than a certain monetary value, frequency, percentage, and/or volume. The threshold may be set by an administrator or engineer to achieve a desired performance of content management system 102, user experience on the web, advertising revenue, popularity of proposed electronic content, popularity or web traffic with respect to content websites 606 or premium website 604, and/or any other goal. For example, content management system 102 may provide a graphical user interface tool (not shown) allowing the manager or engineer to adjust the demand threshold.

If the demand is not greater than the threshold, then method 800 may determine whether there are any additional keywords (e.g., in the list) that have yet to be analyzed (step 808). If there are any additional keywords to be analyzed (step 808; Yes), then method 800 may return to step 802, in which content management system 102 may identify another keyword for analysis. Otherwise, method 800 may end.

If the demand is determined to be greater than the demand threshold (step 806; Yes), then method 800 may perform a supply analysis for electronic content on the Internet 101 associated with the keyword (step 810). For example, as described in detail above and below with reference to FIG. 9, supply system 120 may determine the supply-adjustment value $V_{Supply\text{-}Adjustment}$ for the keyword based on the advertising value $V_{Advertising}$ of the keyword 502 and on the supply adjustment $Supply_{Adjustment}$ of the keyword.

Method 800 may also include determining whether the supply-adjustment value $V_{Supply\text{-}Adjustment}$ for the keyword is above a supply threshold (step 812). For example, supply system 120 may determine whether the supply-adjustment value $V_{supply\text{-}Adjustment}$ is greater than a certain monetary value, frequency, percentage, and/or volume. Similar to the demand threshold, the supply threshold may also be set by a manager or engineer of content management system 112 to achieve a desired goal. If the supply-adjustment value $V_{Supply\text{-}Adjustment}$ is not greater than the threshold (step 812; No), then method 800 may return to step 808 and determine whether there are any additional keywords (e.g., in the list) that have yet to be analyzed.

If the supply-adjustment value $V_{Supply\text{-}Adjustment}$ is determined to be greater than the threshold (step 812; Yes), then method 800 may perform a pricing analysis of electronic content relating to the keyword (step 814). For example, pricing system 122 may determine the value of the electronic content based on a predicted amount of web traffic associated with content websites 606 and/or premium websites 604, a predicted amount of advertising revenue associated with content websites 606 and/or premium websites 604, the demand for the electronic content, the supply-adjustment value $V_{Supply\text{-}Adjustment}$ associated with the keyword, an amount of work or degree of skill required to create the electronic content, a turn-around time for creating the electronic content, and/or other factors.

Method 800 may further include generating a request for electronic content pertaining to the keyword (step 816). A content request may indicate a type of electronic content requested and, if desired, characteristics of such electronic content. For instance, to create a content request, assignment system 124 may generate an electronic data file that includes the target keyword, a topic, a headline, a content description, a summary or abstract, a due date, a price, suggested characteristics, and/or required characteristics associated with the requested electronic content. In certain embodiments, the request for electronic content may be automatically generated by content management system 102. In other embodiments, however, the request may be prepared, at least in part, based on input by one or more of editors 110 (e.g., using an editorial console).

Method 800 may further include assigning the electronic content request generated in step 816 over electronic network 101 (step 818). For example, assignment system 124 may determine, based on the substance of the content request and on stored profiles regarding various contributors, from which contributors to request the electronic content and/or how to request electronic content from those contributors. For example, in one embodiment, assignment system 124 may assign the electronic content request to one or more contributors or users via email, text message, or any other network communication message.

Alternatively, or additionally, in connection with step 818, content management system 102 may populate and/or update the electronic content request page 700 based on the electronic content request. For example, assignment system 124 may update the list 702 of keywords on page 700 with the subject keyword to solicit contributors to create and submit electronic content pertaining to the keyword. By clicking on the keyword in the list 700, a contributor may view additional information regarding the electronic content request, such as, for example, the topic, headline, description, summary or abstract, due date, price, suggested characteristics, and/or required characteristics of the electronic content. In addition, the contributor may claim the electronic content request, and/or may submit electronic content for review by editors 110.

Method 800 may additionally include receiving electronic content submissions from contributors over electronic network 101 (step 820). For example, assignment system 124 or delivery system 104 may receive uploaded electronic content files—such as articles or stories about refinancing a mortgage—from contributors over network 101. Editors 110 may then selectively edit or otherwise manipulate the electronic content, as desired. In some embodiments, editors 110 may then send back the edited electronic content to the contributor(s) for review, comments, edits, etc.

Referring again to FIG. 8, method 800 may also include delivering the received electronic content over electronic network 101 (step 822). For example, delivery system 104 may deliver electronic content to one or more websites, web pages, blogs, mobile devices, software platforms, broadcasts, etc. Upon delivery, search engine system 112 may subsequently parse, categorize, index, and/or catalog any web pages containing the electronic content for serving to users 106 in response to queries for the subject keyword.

In one embodiment, method 800 may also match advertising with the received electronic content (step 824), before or after delivering the electronic content and advertising over network 101. For example, advertising delivery servers 114 and/or content delivery servers 116 may match advertising, such as banner ads, commercials, watermarks, text ads, etc., to the electronic content before it is delivered throughout electronic network 101, which may improve the value obtained by advertisers 109 and increase the amount advertisers 109 are willing to pay for advertising based on the keyword. Of course, assignments and/or electronic content may also be delivered through traditional mechanisms, such as telephone, facsimile, printed communications, etc. After delivering the received electronic content in step 822, method 800 may return to step 808, in which content management system 112 may determine whether there are any additional keywords remaining for analysis.

In certain embodiments, rather than, or in addition to, requesting contributors to submit electronic content in connection with step 818, content management system 112 may highlight or make available existing electronic content pertaining to one or more keywords. For example, content management system 112 may highlight, rearrange, or move existing content relating to a keyword on premium websites 604 and/or content websites 606 to make it more accessible and/or noticeable to users 106. In other embodiments, content management system 112 may determine whether to launch entirely new premium websites 604 and/or content websites 606 with content pertaining to the one or more keywords.

Figure 9:
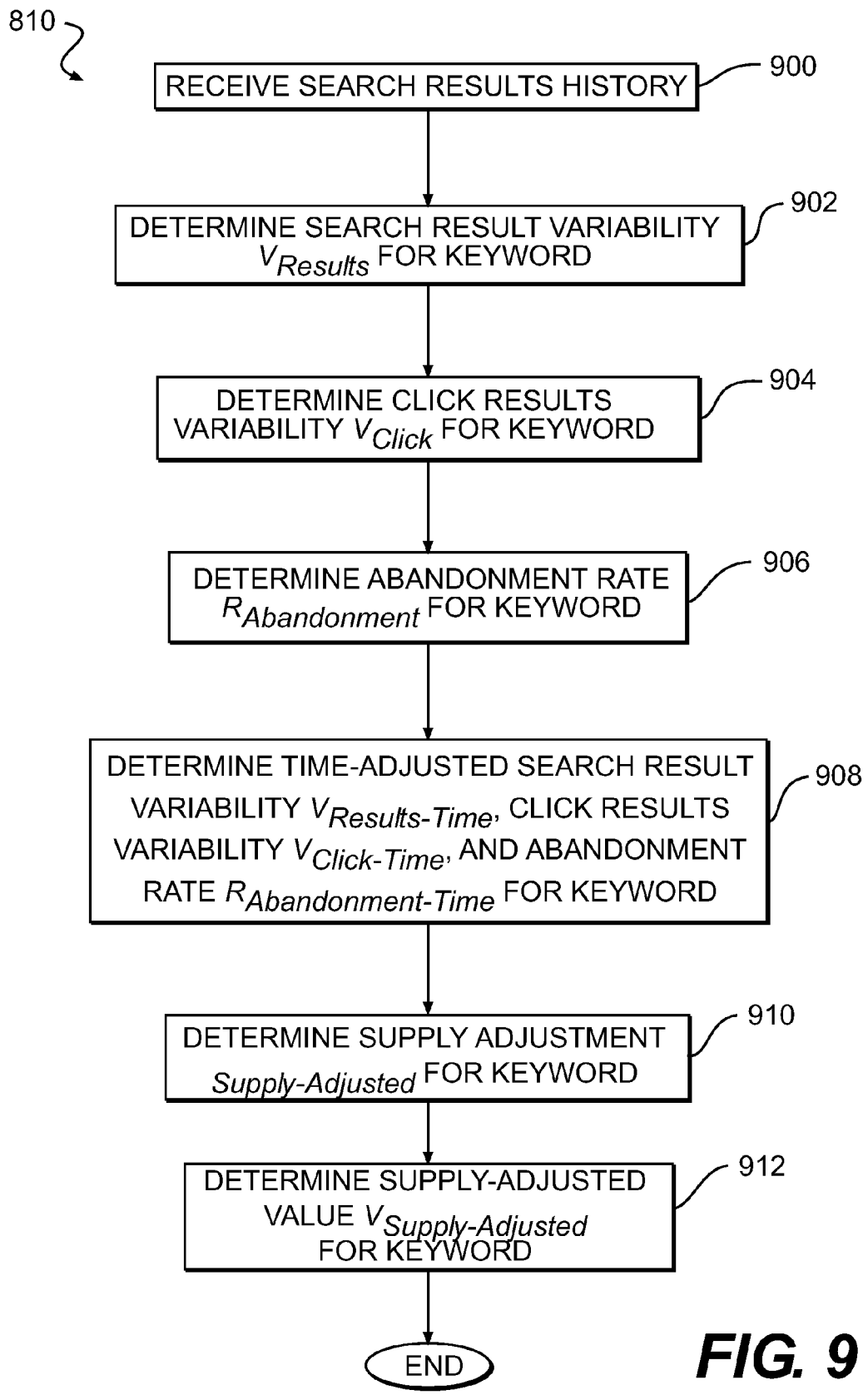
FIG. 9 depicts a flow diagram of an exemplary method for evaluating the supply of electronic content, consistent with the disclosed embodiments.

FIG. 9 depicts a flowchart of an exemplary representation of a method for performing a supply analysis for the keyword. As will be appreciated from this disclosure, the exemplary method of FIG. 9 may be performed as part of step 810 in FIG. 8. Consistent with the present disclosure, the exemplary method of FIG. 9 may be implemented by CPU 302 of a server computer 300 associated with content management system 102, executing computer program instructions stored in memory 304.

As shown in FIG. 9, supply system 120 may receive the search results history 200 from search engine system 112. For example, supply system 120 may receive the search results history 200 in response to a request of search engine system 112 (step 900). Alternatively, supply system 120 may automatically receive the search results history 200 further to an agreement between the entity or entities that own content management system 102 and/or search engine system 112.

Then, using the search results history 200, supply system 120 may determine the search results variability $V_{Results}$ for queries for at least one keyword for one or more desired time periods, as described above (step 902). For example, supply system 120 may determine the search results variability $V_{Results}$ for queries for the keyword "refinance" over each of the past three days.

In addition, based on the search results history 200, supply system 120 may determine the click results variability $V_{Click}$ for queries for the keyword for each of the one or more time periods (step 904), as described above. Further, supply system 120 may determine the abandonment rate $R_{Abandonment}$ of queries for the keyword for each of the one or more time periods (step 906), as described above.

Optionally, supply system 120 may adjust the determined search results variability $V_{Results}$, click results variability $V_{Click}$, and abandonment rate $R_{Abandonment}$ based on the timing of the queries for the keyword (step 908). For example, as described above, supply system 120 may calculate the time-adjusted search results variability $V_{Results-Time}$, the time-adjusted click results variability $V_{Click-Time}$, and the time-adjusted abandonment rate $R_{Abandonment-Time}$ based on the search results variability $V_{Results-M}$, the click results variability $V_{Click-M}$, and the abandonment rate $R_{Abandonment-M}$ for queries for the keyword during each of the time periods M and on their respective time-weight factors $W_M$.

Supply system 120 may then calculate the supply adjustment $Supply_{Adjustment}$ for the supply of electronic content pertaining to the keyword on electronic network 101 (step 910), as described above. For example, supply system 120 may calculate the supply adjustment $Supply_{Adjustment}$ based on the time-adjusted search results variability $V_{Results-Time}$, on the time-adjusted click results variability $V_{Click-Time}$, on the time-adjusted abandonment rate $R_{Abandonment-Time}$, and on the weight factors $W_{Results}$, $W_{Click}$, and $W_{Abandonment}$, as described above.

Finally, supply system 120 may determine the supply-adjustment value $V_{Supply-Adjustment}$ for the keyword (step 912). For example, as described above, supply system 120 may look up the subject keyword in keyword advertising value table 400 to determine the corresponding advertising value $V_{Advertising}$. In the example shown in FIG. 4, supply system 120 would determine an advertising value $V_{Advertising}$ of $0.005 CPM, as the subject keyword is "refinance." Then, supply system 120 may determine the supply-adjustment value $V_{Supply-Adjustment}$ using the determined advertising value $V_{advertising}$ of the keyword and the supply adjustment $Supply_{Adjustment}$ for the supply of electronic content relating to the keyword, as described above.

Figure 10:
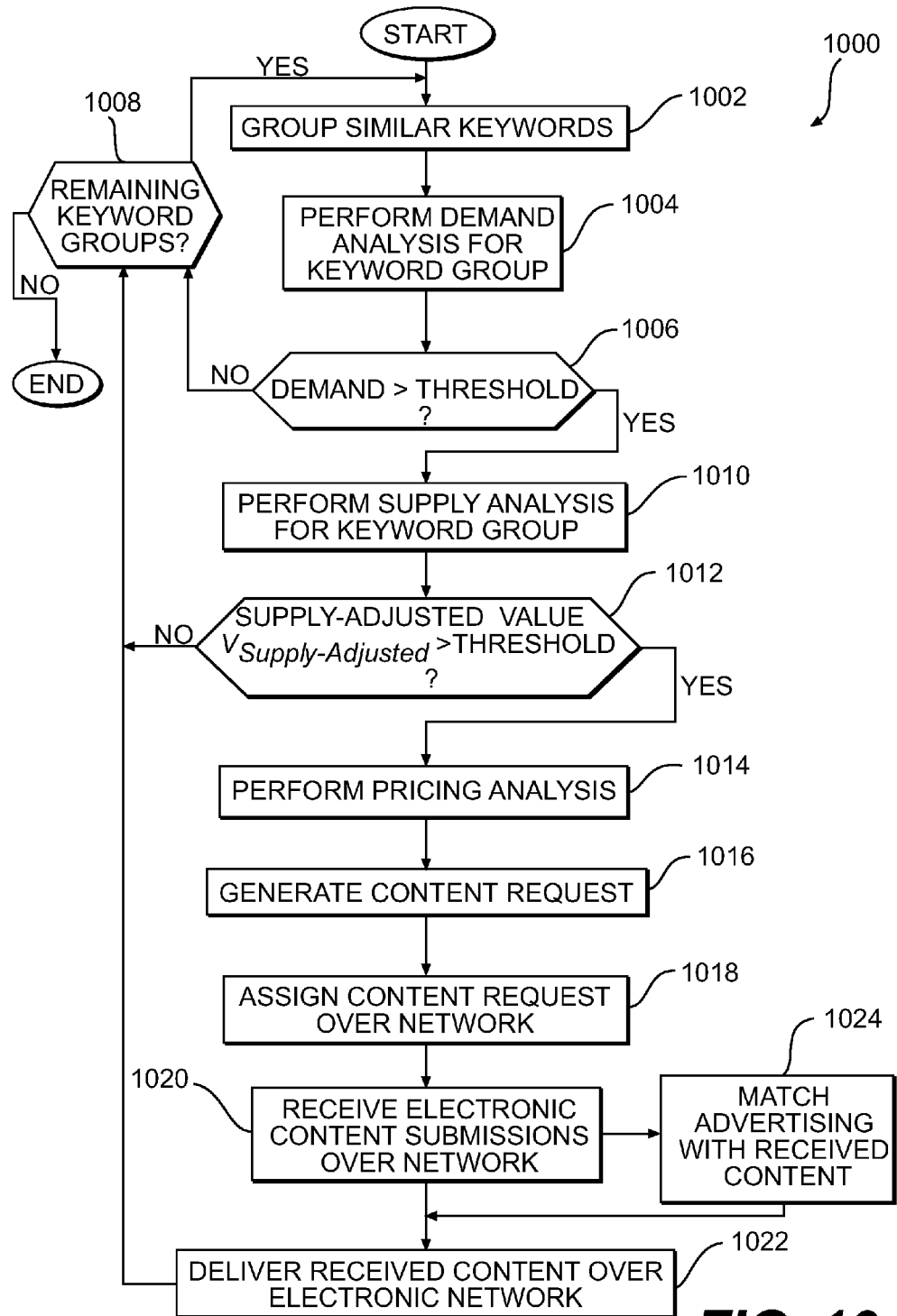
FIG. 10 depicts a flow diagram of an exemplary alternative method for managing electronic content, consistent with the disclosed embodiments.

FIG. 10 depicts a flow chart of an alternative exemplary method 1000 for managing online content. Method 1000 is similar to method 800, except that method 1000 performs the analysis with respect to a group of similar keywords rather than a single keyword. Like method 800, method 1000 may be performed by CPU 302 of a server computer 300 associated with content management system 102, executing computer program instructions stored in memory 304.

Method 1000 may include grouping similar keywords into a keyword group for analysis (step 1002). For example, content management system 102 may select a keyword (e.g., "refinance") from a predetermined list of keywords, and may use one or more methods to identify a group of keywords that are similar to the selected keyword. Such methods may include, for example, keyword "stemming." For instance, in the case of the keyword "refinance," content management system 102 may identify a group of keywords that includes "refinancing," "refinanced," and "refinance." Content management system 102 may also identify one or more synonyms of the selected keyword as being in the keyword group. For example, in the case of the keyword "happy," content management system 102 may identify a group of keywords including "happy," "blessed," "blissful," "cheerful," "content," "delighted," "ecstatic," "joyful," "joyous," and/or other synonyms of "happy." But it is to be appreciated that other methods of identifying a group of keywords based on the selected keyword may be employed.

Method 1000 may also include performing a demand analysis for the group of keywords identified in step 1002 (step 1004). For instance, demand system 118 may analyze information from web traffic, user behavior/preferences, search results history 200, impression, click, and/or conversion logs, proxy logs, toolbar logs, social networking feeds, external sources, etc., as described above, to determine demand of users 106 for electronic content associated with each of the keywords in the keyword group. The demand may be determined as a monetary value (e.g., CPM value), a keyword frequency, a demand volume, and/or any other suitable demand metric indicative of the demand of users 106 for electronic content pertaining to the keyword.

Method 1000 may also include determining whether the demand for electronic content associated with the group of keywords, determined in step 1004, is greater than a certain demand threshold (step 1006). For example, demand system 118 may determine whether the demand is greater than a certain monetary value, frequency, percentage, and/or volume. As discussed above, the threshold may be set by an administrator or engineer to achieve a desired performance of content management system 102, user experience on the web, advertising revenue, popularity of proposed electronic content, popularity or web traffic with respect to content websites 606 or premium website 604, and/or any other goal. For example, content management system 102 may provide a graphical user interface tool (not shown) allowing the manager or engineer to adjust the demand threshold.

If the demand is not greater than the threshold, then method 1000 may determine whether there are any additional groups of keywords that have yet to be analyzed (step 1008). If there are any additional keywords to be analyzed (step 1008; Yes), then method 1000 may return to step 1002, in which content management system 102 may identify another group of keywords for analysis. Otherwise, method 1000 may end.

If the demand is determined to be greater than the demand threshold (step 1006; Yes), then method 1000 may perform a supply analysis for electronic content on the Internet 101 associated with the group of keywords (step 1010). For example, as described in detail above and below with reference to FIG. 11, supply system 120 may determine the supply-adjustment value $V_{Supply\text{-}Adjustment}$ for the group of keywords based on the advertising value $V_{Advertising}$ of the group of keywords and on the supply adjustment $Supply_{Adjustment}$ of the group of keywords.

Method 1000 may also include determining whether the supply-adjustment value $V_{Supply\text{-}Adjustment}$ for the group of keywords is above a supply threshold (step 1012). For example, supply system 120 may determine whether the supply-adjustment value $V_{Supply\text{-}Adjustment}$ is greater than a certain monetary value, frequency, percentage, and/or volume. Similar to the demand threshold, the supply threshold may also be set by a manager or engineer of content management system 112 to achieve a desired goal. If the supply-adjustment value $V_{Supply\text{-}Adjustment}$ is not greater than the threshold (step 1012; No), then method 1000 may return to step 1008 and determine whether there are any additional groups of keywords that have yet to be analyzed.

If the supply-adjustment value $V_{Supply\text{-}Adjustment}$ is determined to be greater than the threshold (step 1012; Yes), then method 1000 may perform a pricing analysis of electronic content relating to the group of keywords (step 1014). For example, pricing system 122 may determine the value of the electronic content based on a predicted amount of web traffic associated with content websites 606 and/or premium websites 604, a predicted amount of advertising revenue associated with content websites 606 and/or premium websites 604, the demand for the electronic content, the supply-adjustment value $V_{Supply\text{-}Adjustment}$ associated with the group of keywords, an amount of work or degree of skill required to create the electronic content, a turn-around time for creating the electronic content, and/or other factors.

Method 1000 may further include generating a request for electronic content pertaining to the group of keywords (step 1016). For example, assignment system 124 may generate a request for electronic content pertaining to a representative keyword that is representative of the entire group of keywords. For instance, "refinance" may be a representative keyword for "refinance," "refinancing," and "refinance."

A content request may indicate a type of electronic content requested and, if desired, characteristics of such electronic content. For instance, to create a content request, assignment system 124 may generate an electronic data file that includes the target keyword, a topic, a headline, a content description, a summary or abstract, a due date, a price, suggested characteristics, and/or required characteristics associated with the requested electronic content. In certain embodiments, the request for electronic content may be automatically generated by content management system 102. In other embodiments, however, the request may be prepared, at least in part, based on input by one or more of editors 110 (e.g., using an editorial console).

Method 1000 may further include assigning the request for electronic content pertaining to the keyword group (i.e., the representative keyword) generated in step 1016 over electronic network 101 (step 1018). For example, assignment system 124 may determine, based on the substance of the content request and on stored profiles regarding various contributors, from which contributors to request the electronic content and/or how to request electronic content from those contributors. For example, in one embodiment, assignment system 124 may assign the electronic content request to one or more contributors or users via email, text message, or any other network communication message.

Alternatively, or additionally, in connection with step 818, content management system 102 may populate and/or update the electronic content request page 700 based on the electronic content request. For example, assignment system 124 may update the list 702 of keywords on page 700 to solicit contributors to create and submit electronic content on a topic corresponding to the group of keywords. By clicking on the topic in the list 700, a contributor may view additional information regarding the electronic content request, such as, for example, the topic, headline, description, summary or abstract, due date, price, suggested characteristics, and/or required characteristics of the electronic content. In addition, the contributor may claim the electronic content request, and/or may submit electronic content for review by editors 110.

Method 1000 may additionally include receiving electronic content submissions from contributors over electronic network 101 (step 1020). For example, assignment system 124 or delivery system 104 may receive uploaded electronic content files—such as articles or stories about refinancing a mortgage—from contributors over network 101. Editors 110 may then selectively edit or otherwise manipulate the electronic content, as desired. In some embodiments, editors 110 may then send back the edited electronic content to the contributor(s) for review, comments, edits, etc.

Referring again to FIG. 10, method 1000 may also include delivering the received electronic content over electronic network 101 (step 1022). For example, delivery system 104 may deliver electronic content to one or more websites, web pages, blogs, mobile devices, software platforms, broadcasts, etc. Upon delivery, search engine system 112 may subsequently parse, categorize, index, and/or catalog any web pages containing the electronic content for serving to users 106 in response to queries for the subject keyword.

In one embodiment, method 1000 may also match advertising with the received electronic content (step 1024), before or after delivering the electronic content and advertising over network 101. For example, advertising delivery servers 114 and/or content delivery servers 116 may match advertising, such as banner ads, commercials, watermarks, text ads, etc., to the electronic content before it is delivered throughout electronic network 101, which may improve the value obtained by advertisers 109 and increase the amount advertisers 109 are willing to pay for advertising based on the keyword. Of course, assignments and/or electronic content may also be delivered through traditional mechanisms, such as telephone, facsimile, printed communications, etc. After delivering the received electronic content in step 1022, method 1000 may return to step 1008, in which content management system 112 may determine whether there are any additional keyword groups remaining for analysis.

In certain embodiments, rather than, or in addition to, requesting contributors to submit electronic content in connection with step 1018, content management system 112 may highlight or make available existing electronic content pertaining to one or more keywords or groups of keywords. For example, content management system 112 may highlight, rearrange, or move exiting content relating to a keyword on premium websites and/or content websites 606 to make it more accessible and/or noticeable to users 106. In other embodiments, content management system 112 may determine whether to launch entirely new premium websites 604 and/or content websites 606 with content pertaining to the keywords or groups of keywords.

Figure 11:
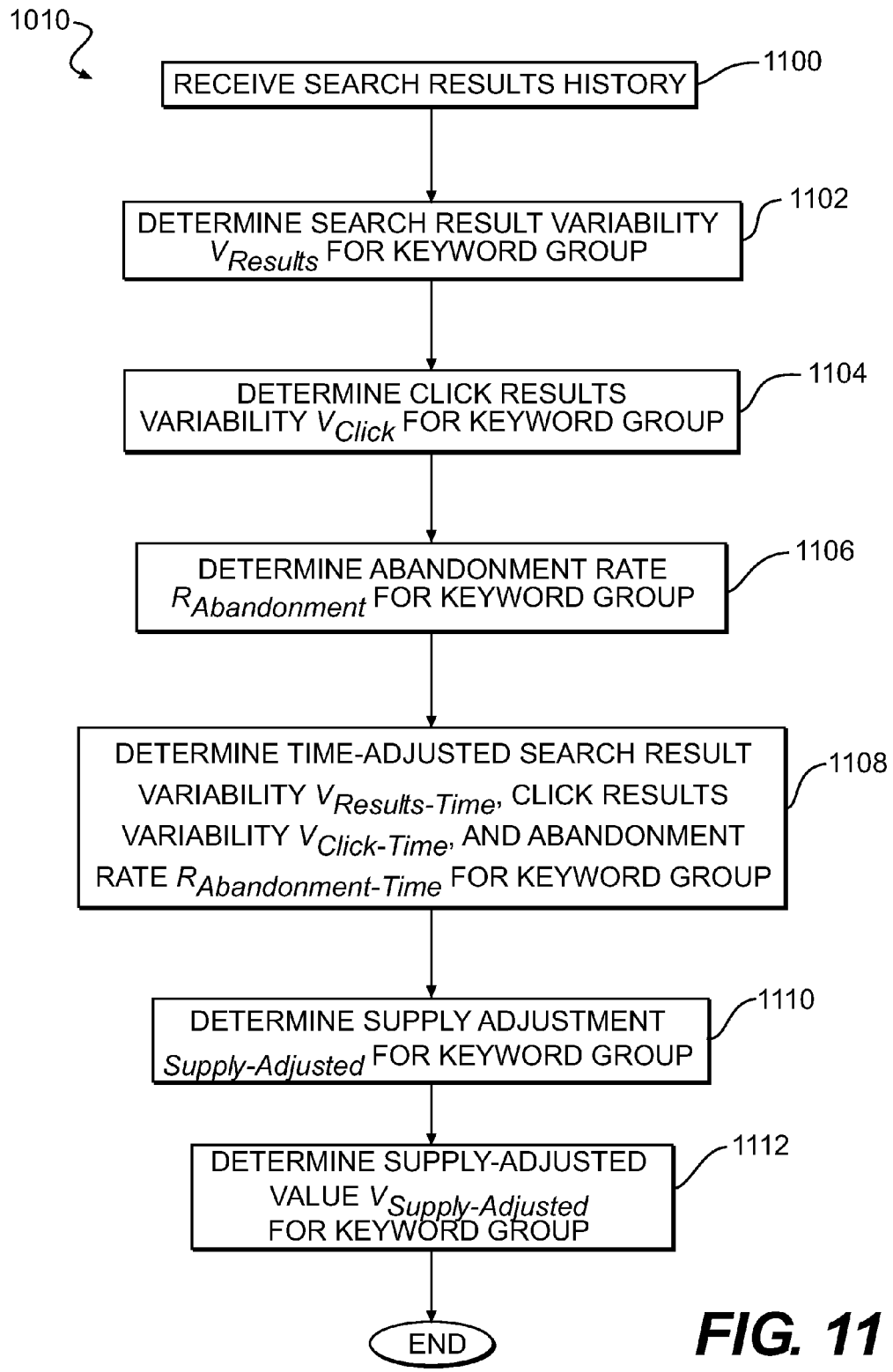
FIG. 11 depicts a flow diagram of an exemplary alternative method for evaluating the supply of electronic content, consistent with the disclosed embodiments.

FIG. 11 depicts a flowchart of an exemplary method for performing a supply analysis for the group of keywords. As will be appreciated from this disclosure, the exemplary method of FIG. 11 may be performed as part of step 1010 in FIG. 10. Consistent with the present disclosure, the method of FIG. 11 may be implemented by CPU 302 of a server computer 300 associated with content management system 102, executing computer program instructions stored in memory 304.

As shown in FIG. 11, supply system 120 may receive the search results history 200 from search engine system 112. For example, supply system 120 may receive the search results history 200 in response to a request of search engine system 112 (step 1100). Alternatively, supply system 120 may automatically receive the search results history 200 further to an agreement between the entity or entities that own content management system 102 and/or search engine system 112.

Then, using the search results history 200, supply system 120 may determine the search results variability $V_{Results}$ for queries for the keywords in the group across one or more desired time periods (step 1102). In one embodiment, supply system 120 may determine a combined search results variability $V_{Results}$ for the keywords in the group (i.e., treating each keyword in the group as if it were the same keyword).

Alternatively, supply system 120 may determine a search results variability $V_{Results}$ for each keyword in the group, and then average the individual search results variabilities $V_{Results}$ based on the respective number of queries for each keyword in the group, to determine an average search results variability $V_{Results}$ for the group. But it is to be appreciated that other methods of calculating a combined or average search results variability $V_{Results}$ for the keyword group may be employed. For example, supply system 120 may determine a combined or average search results variability $V_{Results}$ for queries for the keyword group "refinance," "refinanced," and "refinancing" over each of the past three days.

In addition, based on the search results history 200, supply system 120 may determine the click results variability $V_{Click}$ for queries for the keywords in the group for each of the one or more time periods (step 1104), as described above. In one embodiment, supply system 120 may determine a combined click results variability $V_{Click}$ for the keywords in the group (i.e., treating each keyword in the group as if it were the same keyword). Alternatively, supply system 120 may determine a click results variability $V_{Click}$ for each keyword in the group, and then average the click results variabilities $V_{Click}$ based on the respective number of queries for each keyword in the group, to determine an average click results variability $V_{Click}$ for the group. But it is to be appreciated that other methods of calculating a combined or average click results variability $V_{Click}$ for the keyword group may be employed.

Further, supply system 120 may determine the abandonment rate $R_{Abandonment}$ of queries for keywords in the group for each of the one or more time periods (step 1106), as described above. In one embodiment, supply system 120 may determine a combined abandonment rate $R_{Abandonment}$ for queries for the keywords in the group (i.e., treating each keyword in the group as if it were the same keyword). Alternatively, supply system 120 may determine an abandonment rate $R_{Abandonment}$ for each keyword in the group, and then average the abandonment rate $R_{Abandonment}$ based on the respective number of queries for each keyword in the group, to determine an abandonment rate $R_{Abandonment}$ for the group. But it is to be appreciated that other methods of calculating a combined or average click results variability $V_{Click}$ for the keyword group may be employed.

Optionally, supply system 120 may adjust the determined search results variability $V_{Results}$, click results variability $V_{Click}$, and abandonment rate $R_{Abandonment}$ based on the timing of the queries for the keyword (step 1108). For example, as described above, supply system 120 may calculate the time-adjusted search results variability $V_{Results-Time}$, the time-adjusted click results variability $V_{Click-Time}$, and the time-adjusted abandonment rate $R_{Abandonment-Time}$ based on the search results variability $V_{Results-M}$, the click results variability $V_{Click-M}$, and the abandonment rate $R_{Abandonment-M}$ for queries for the keywords in the group during each of the time periods M and on their respective time-weight factors $W_M$.

Supply system 120 may then calculate the supply adjustment $Supply_{Adjustment}$ for the supply of electronic content pertaining to the keyword group on electronic network 101 (step 1110), as described above. For example, supply system 120 may calculate the supply adjustment $Supply_{Adjustment}$ based on the time-adjusted search results variability $V_{Results-Time}$, on the time-adjusted click results variability $V_{Click-Time}$, on the time-adjusted abandonment rate $R_{Abandonment-Time}$, and on the weight factors $W_{Results}$, $W_{Click}$, and $W_{Abandonment}$, as described above.

Finally, supply system 120 may determine the supply-adjustment value $V_{Supply-Adjustment}$ for the keyword group (step 1112). For example, supply system 120 may look up the each keyword in the group in advertising value table 400 to determine the corresponding advertising value $V_{Advertising}$, and then determine a combined or average advertising value $V_{Advertising}$ for the keyword group based on the respective number of queries for each keyword in the group. Then, supply system 120 may determine the supply-adjustment value $V_{Supply-Adjustment}$ using the determined advertising value $V_{Advertising}$ of the keyword and the supply adjustment $Supply_{Adjustment}$ for the supply of electronic content relating to the keyword group, as described above.

As is apparent from the above description, implementation of the disclosed embodiments may enhance the experience of users of an electronic network, such as the Internet, as well as increase revenue due to online advertising. For example, the disclosed methods and systems evaluate characteristics of the supply of electronic content on an electronic network pertaining to one or more keywords. In particular, the disclosed methods and systems determine the variability of search results for queries for the keywords, the variability in which links in the search results users actually click, and/or the rate at which users abandon the queries entirely. Based on these parameters, the sufficiency the supply of electronic content on the network relating to the keywords is determined. Moreover, if the supply is determined to be insufficient, and/or the advertising value associated with the keyword is sufficiently high, additional electronic content targeted to the keyword can be requested, created, and injected into the online marketplace. Thus, the user's online experience may be improved and, at the same time, online advertising revenue may be increased.

One skilled in the art will appreciate that computer programs for implementing the disclosed methods may be stored on and/or read from computer-readable storage media. The computer-readable storage media may have stored thereon computer-executable instructions which, when executed by a computer, such as server 300, cause the computer to perform, among other things, the processes disclosed herein. Exemplary computer-readable storage media may include magnetic storage devices, such as a hard disk, a floppy disk, magnetic tape, or another magnetic storage device known in the art; optical storage devices, such as CD-ROM, DVD-ROM, or another optical storage device known in the art; and/or electronic storage devices, such as EPROM, a flash drive, or another integrated circuit storage device known in the art. The computer-readable storage media may be embodied by or in one or more components of environment 100.

One skilled in the art will further realize that the processes illustrated in this description may be implemented in a variety of ways and may include multiple other modules, programs, applications, scripts, processes, threads, or code sections that may all functionally interrelate to accomplish the individual tasks described above. For example, it is contemplated that these programs modules may be implemented using commercially available software tools, using custom object-oriented code written in the C++ programming language, using applets written in the Java programming language, or may be implemented as with discrete electrical components or as one or more hardwired application specific integrated circuits (ASIC) custom designed for this purpose. In addition, the disclosure may be implemented in a variety of different data communication network environments and may use software, hardware, or a combination of hardware and software to provide the disclosed functions.

The many features and advantages of the present disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A computer-implemented method for evaluating the supply of electronic content on an electronic network, the method comprising:
    receiving search results history for a plurality of queries by users for at least one keyword;
    determining, with at least one processor, a search results variability of the search results history for the plurality of queries for at the least one keyword, wherein determining the search results variability includes calculating a number of unique results contained in the search results history for the plurality of queries for the at least one keyword;
    determining, with the at least one processor, a supply value indicative of a supply of electronic content on the electronic network relating to the at least one keyword, based on the determined search results variability; and
    making available, over the electronic network, additional supply of electronic content relating to the at least one keyword based on the determined supply value.

2. The method of claim 1, further including:
    determining, based on the search results history, a variability in which search results users select with respect to the queries for the at least one keyword; and
    determining the supply value based further on the determined variability in which results the users select.

3. The method of claim 1, further including:
    determining, based on the search results history, a rate at which users abandon the queries for the at least one keyword; and
    determining the supply value based further on the abandonment rate.

4. The method of claim 1, further including:
    determining an advertising value associated with the at least one keyword;
    adjusting the supply value based on the determined advertising value; and
    making available the additional supply of electronic content relating to the at least one keyword based on the adjusted supply value.

5. The method of claim 1, further including:
    determining, based on the search results history, a time period associated with the queries for the at least one keyword;
    adjusting the supply value based on the time period; and
    making available the additional supply of electronic content relating to the at least one keyword based on the adjusted supply value.

6. The method of claim 1, wherein further including:
    determining whether the supply value is above a supply threshold; and
    making available the additional supply of electronic content relating to the at least one keyword when the supply value is above the supply threshold.

7. The method of claim 1, wherein making available the additional supply of electronic content includes at least one of:

sending, over the electronic network, a communication to a contributor requesting the contributor to create and submit electronic content relating to the at least one keyword; and posting on a website a solicitation to create and submit electronic content relating to the at least one keyword.

8. The method of claim 1, further comprising:

receiving electronic content relating to the at least one keyword over the electronic network; and providing the received electronic content on an associated content web page.

9. The method of claim 1, wherein the at least one keyword includes a group of related keywords.

10. A computer-implemented method for evaluating the supply of electronic content on an electronic network, the method comprising:

receiving search results history for a plurality of queries by users for at least one keyword;

determining, with at least one processor, a click results variability for the plurality of queries for the at least one keyword, wherein determining the click results variability includes calculating a number of times each unique result contained in the search results history was clicked on;

determining a search results variability of the search results history for the plurality of queries for at the least one keyword, wherein determining the search results variability includes calculating a number of unique results contained in the search results history for the plurality of queries for the at least one keyword;

determining, with at least one processor, a supply value indicative of a supply of electronic content on the electronic network relating to the at least one keyword, based on at least one of the determined click results variability or the determined search results variability; and making available, over the electronic network, additional supply of electronic content relating to the at least one keyword, based on the determined supply value.

11. The method of claim 10, further including:

determining, based on the search results history, a rate at which the queries for the at least one keyword are abandoned; and determining the supply value based further on the abandonment rate.

12. The method of claim 10, further including:

determining an advertising value associated with the at least one keyword;

adjusting the supply value based the determined advertising value; and making available the additional supply of electronic content relating to the at least one keyword based on the adjusted supply value.

13. The method of claim 10, further including:

determining, based on the search results history, a time period associated with the queries;

adjusting the supply value based the time period; and requesting the at least one contributor to submit electronic content relating to the at least one keyword based on the adjusted supply value.

14. The method of claim 10, further including:

determining whether the supply value is above a supply threshold; and making available the additional supply of electronic content relating to the at least one keyword when the supply value is above the supply threshold.

15. The method of claim 10, wherein making available the additional supply of electronic content includes at least one of:

sending, over the electronic network, a communication to a contributor requesting the contributor to create and submit electronic content relating to the at least one keyword; and posting on a website a solicitation to create and submit electronic content relating to the at least one keyword.

16. The method of claim 10, further comprising:

receiving electronic content relating to the at least one keyword over the electronic network; and providing the received electronic content on an associated content web page.

17. The method of claim 10, wherein the at least one keyword includes a group of related keywords.

18. A computer-implemented method for evaluating the supply of electronic content on an electronic network, the method comprising:

receiving search results history for a plurality of queries by users for at least one keyword;

determining, based on the search results history, an abandonment rate for the plurality of queries for the at least one keyword, wherein determining the abandonment rate includes calculating a number of times the users abandoned queries by not clicking on any result in the search results history for the plurality of queries for the at least one keyword;

determining a search results variability of the search results history for the plurality of queries for at the least one keyword, wherein determining the search results variability includes calculating a number of unique results contained in the search results history for the plurality of queries for the at least one keyword;

determining, with at least one processor, a supply value indicative of a supply of electronic content on the electronic network relating to the at least one keyword, based on at least one of the determined search results variability or the determined abandonment rate; and making available, over the electronic network, an additionally supply of electronic content relating to the at least one keyword based on the determined supply value.

19. The method of claim 18, further including:

determining an advertising value associated with the at least one keyword;

adjusting the supply value based the determined advertising value; and making available the additional supply of electronic content relating to the at least one keyword based on the adjusted supply value.

20. The method of claim 19, further including:

determining, based on the search results history, a time period associated with the queries for the at least one keyword;

adjusting the supply value based the time period; and making available the additional supply of electronic content relating to the at least one keyword based on the adjusted supply value.

21. The method of claim 18, further comprising:

receiving, over the electronic network, electronic content relating to the at least one keyword; and providing the received electronic content on an associated content web page.

22. The method of claim 18, wherein the at least one keyword includes a group of related keywords.

23. A computer-implemented method for evaluating the supply of electronic content on an electronic network, the method comprising:
- receiving search results history for a plurality of queries by users for at least one keyword;
- determining, with at least one processor at least one of the following:
  - a search results variability of the search results history for the plurality of queries for the at least one at least one keyword, wherein determining the search results variability includes calculating a number of unique results contained in the search results history for the plurality of queries for the at least one keyword;
  - a click results variability for queries for the at least one keyword, wherein determining the click results variability includes calculating a number of times each unique result contained in the search results history was clicked on; and
  - an abandonment rate for the plurality of queries for the at least one keyword, wherein determining the abandonment rate includes calculating a number of times the users abandoned queries by not clicking on any result in the search results history for the plurality of queries for the at least one keyword;
- determining, with at least one processor, a supply value indicative of a supply of electronic content on the electronic network relating to the at least one keyword, based on the at least one of the search results variability, the click results variability, or the abandonment rate; and
- making an additional supply of electronic content relating to the at least one keyword available on the electronic network, based on the determined supply value.

24. The method of claim 23, wherein making available the additional supply of electronic content available includes requesting at least one contributor to generate new electronic content relating to the at least one keyword or highlighting existing electronic content relating to the at least one keyword on a content web site.

25. The method of claim 23, wherein the at least one keyword includes a group of related keywords.

* * * * *